(12) United States Patent
Murayama

(10) Patent No.: US 8,391,116 B2
(45) Date of Patent: Mar. 5, 2013

(54) OPTICAL DISC RECORDING METHOD AND OPTICAL DISC RECORDING APPARATUS

(75) Inventor: Toshiyuki Murayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/326,948

(22) Filed: Dec. 15, 2011

(65) Prior Publication Data

US 2012/0163143 A1    Jun. 28, 2012

(30) Foreign Application Priority Data

Dec. 22, 2010  (JP) ................................ P2010-285542

(51) Int. Cl.
  *G11B 7/00*    (2006.01)
(52) U.S. Cl. ..................... 369/47.53; 369/116
(58) Field of Classification Search .............. 369/116, 369/47.51, 47.52, 47.53, 120, 121, 122
  See application file for complete search history.

(56) References Cited

U.S. PATENT DOCUMENTS

| 2006/0153440 A1* | 7/2006 | Treves et al. .................. 382/152 |
| 2009/0310450 A1 | 12/2009 | Terada | |

FOREIGN PATENT DOCUMENTS

JP    2009-301634    12/2009

* cited by examiner

*Primary Examiner* — Nabil Hindi
(74) *Attorney, Agent, or Firm* — Frommer Lawrence & Haug LLP; William S. Frommer

(57) ABSTRACT

An optical disc recording method of determining a disc address when write and read operations are performed for an optical disc during recording power calibration in an optical disc recording apparatus having at least two optical head units including first and second optical head units is disclosed. The method includes: determining a first recording power calibration start address, which is an address at which the first optical head unit starts calibration of the recording power, from a power calibration area provided in advance as an area used to calibrate the recording power; and determining an address obtained by adding a range of the power calibration area used to calibrate the recording power to the first recording power calibration start address as a second recording power calibration start address, which is an address at which the second optical head unit starts calibration of the recording power.

10 Claims, 21 Drawing Sheets

FIG.13A

| CHANNEL NAME X | B | C | D |
|---|---|---|---|
| x | 1 | 2 | 3 |

FIG.13B

| CHANNEL NAME X | B | C | D | E | ... |
|---|---|---|---|---|---|
| x | 1 | 2 | 3 | 4 | ... |

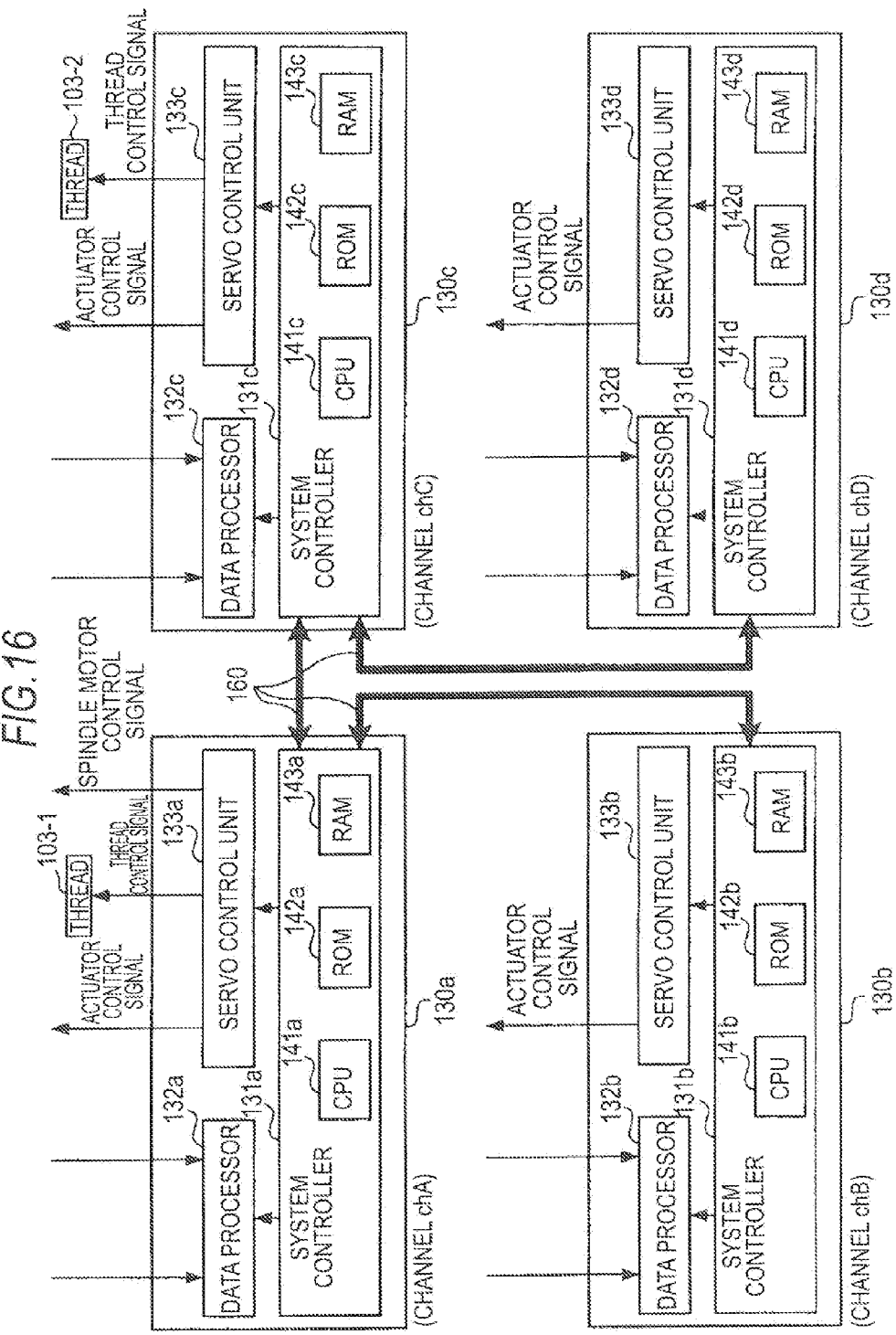

US 8,391,116 B2

OPTICAL DISC RECORDING METHOD AND OPTICAL DISC RECORDING APPARATUS

FIELD

The present disclosure relates to an optical disc recording apparatus and an optical disc recording method used in the optical disc recording apparatus, and more particularly, to a technique of determining a disc address for executing optimum power calibration (OPC) for obtaining the optimum recording power.

BACKGROUND

In general, an optical disc recording apparatus that performs recording on a writable optical disc performs, in advance to recording, a step of obtaining the optimum recording power through calibration (hereinafter, referred to as OPC: optimum power calibration) in order to optimize a laser power for recording. In a case where the optical disc is rewritable, the optical disc recording apparatus shifts the optical head to the power calibration area, which is a rewritable area provided on the disc in advance, and executes the OPC thereon.

Typically, the number of recording unit blocks (RUBs) used in the OPC is set to a predetermined number in advance. A destination of the optical head for initiating the OPC may be set to any place in the power calibration area if a predetermined number of RUBs can be continuously obtained. That is, the start address of the OPC may be set to any place in the power calibration area as long as a predetermined number of RUBs can be continuously obtained. However, this is based on the assumption that the optical disc recording apparatus has only a single optical head.

The optical disc recording apparatus performs the OPC as a calibration process for optimizing laser emission power in the writing thereof before the write process. The OPC is controlled by the system controller. A basic OPC sequence is as follows.

(1) The write operation is performed only for a predetermined number of RUBs corresponding to the OPC start address designated by the system controller with the OPC evaluation power.

(2) The written portion is read.

(3) The system controller computes the optimum write power based on the amplitude of the read RE signal. In addition, OPC convergence is assumed when the optimum write power is found. For example, JP-A-2009-301634 discloses a technique of more easily improving stability of the OPC convergence value.

SUMMARY

Meanwhile, in order to improve the recording/reproduction bit rate, there has been proposed an optical disc recording apparatus capable of simultaneously operating such heads for a single disc by arranging a plurality of optical heads in a single optical disc recording apparatus. In this case, it may be problematic if the OPC start position is simply designated as "any place in the power calibration area for each head" as in the related art.

An exemplary configuration of an optical disc recording apparatus having two optical heads is illustrated in FIGS. 20A and 20B. FIG. 20A is a side view illustrating the optical disc apparatus as seen from the side, and FIG. 20B is a top view illustrating the optical disc apparatus as seen from the top. As shown in FIG. 20A, a spindle motor 201 for rotating an optical disc 250 is installed in a pedestal 220, and the optical disc 250 is installed on the spindle motor 201. An axis 204 having a thread 203 is also installed in the pedestal 220, and laser light LB is irradiated onto the optical disc 250 from an object lens 211a of an optical head unit 210a arranged on the thread 203. Although only the optical head unit 210a and the object lens 211a are illustrated in FIG. 20A, it is assumed that an optical head unit 210b and an object lens 211b are further arranged in the depthwise direction in the drawing.

The optical head unit 210a and the optical head unit 210b are arranged on a single thread 203 as described above. The thread 203 is arranged on the two axes 204, and is driven by the servo control unit (not shown) to move on the axes 204 in a radial direction of the optical disc 250 in parallel with the optical disc 250. In addition, as described below, the object lens 211a in the optical head unit 210a and the object lens 211b in the optical head unit 210b shown in FIG. 20B independently move on the thread 203 in a radial direction of the optical disc 250. In the following description, it is assumed that the processing channel for the signal treated in the optical head unit 210a side is referred to as a channel chA, and the processing channel for the signal treated in the optical head unit 210b is referred to as a channel chB.

FIG. 21 is a diagram illustrating the movable ranges of the object lenses 211a and 211b of the channels chA and chB on the thread 203. The object lenses 211a and 211b are independently movable by ±N RUBs in a radial direction of the optical disc 250 with respect to the reference position Rp on the thread 203 as illustrated as a one-dotted chain line. That is, the object lenses 211a and 211b are movable with a maximum interval of 2N RUBs. The value N of "±N RUBs" used as the movable range of the object lenses 211a and 211b is defined based on a specification of the mechanism for driving the object lenses 211a and 211b, and may be set to, for example, 250 and the like. If the value N is set to 250, a distance between the object lenses 211a and 211b when the object lenses 211a and 211b are operated with the largest interval becomes 2N=2×250=500 RUBs.

It is assumed that the OPC is independently executed for the channels chA and chB by using the area of 2N RUBs as a target. FIG. 22 illustrates an exemplary range used in the OPC for each of the channels chA and chB. Here, the number of RUBs used in a single try of the OPC is set to 6 RUBs. The fact that the OPC is independently executed for the channels chA and chB means that the address for starting the OPC is independently selected for the channels chA and chB. In this case, if control is not appropriately performed to select the start address of the OPC for each channel, the area used in the OPC may be overlapped between the channels chA and chB.

Referring to FIG. 22, a range of 6 RUBs from the leftmost RUB is allocated as the area used in the OPC for the channel chA. A range of 6 RUBs from the third RUB from the leftmost is allocated as the area used in the OPC for the channel chB. For the OPC, the following three processes are performed as described above.

(1) write at a predetermined power level;
(2) read the written portion; and
(3) compute the optimum recording power based on the read RF information.

However, in a case where the area used in the OPC for the channel chA and the area used in the OPC for the channel chB are set to be equal as illustrated in FIG. 22, the portion written for one channel may be overwritten by the other channel. For example, the RUB written for the channel chA may be overwritten by the channel chB before the channel chA reads the RUB. Such an overwriting operation may occur between the third RUB from the leftmost side and the third RUB from the rightmost side as shown in FIG. 22 as a halftone dotted area. When the overwriting occurs, it is difficult to appropriately compute the optimum recording power for each channel.

In order to address such a problem, a technique of executing the OPC for the channel chB after the OPC for the channel chA is terminated has been proposed. In this case, similar to the technique in the optical disc driver device having a single optical head drive, the OPC start position may be set to "any place in the power calibration area." However, in this technique, if the optical disc recording apparatus has a plurality of optical head units, the time taken to complete the OPC for all optical head units increases in proportion as the number of optical head units increases.

Typically, the OPC is executed during startup. The startup includes various calibration cycles performed after the disc is installed until the write/read operation can be made. Therefore, as the OPC time increases, the startup time also increases. If the startup time increases, it is difficult to read or write the disc soon after the disc is installed. Therefore, the usability of the drive is degraded, and this makes a user feel significant stress.

Thus, it is desirable to provide an optical disc recording apparatus having a plurality of optical head units in which the OPC (calibration of the recording power) can be performed within a short time without degrading precision of the computed optimum power value.

An optical disc recording method according to an embodiment of the present disclosure is applied to an optical disc recording apparatus having at least two optical head units including first and second optical head units. In such an optical disc recording apparatus, first, out of the power calibration area provided in advance as an area for calibrating the recording power, the first recording power calibration start address as an address at which the first optical head unit starts the recording power calibration is determined. Next, the address obtained by adding the range of the power calibration area used to calibrate the recording power to the first recording power calibration start address is determined as the second recording power calibration start address as an address at which the second optical head unit starts the recording power calibration.

An optical disc recording apparatus according to another embodiment of the present disclosure includes a rotation drive unit, a first optical head unit, a second optical head unit, a thread, a first servo control unit, a second servo control unit, a first system controller, and a second system controller. The functions and configurations of each unit are as follows. The rotation drive unit rotates an optical disc. The first optical head unit includes an object lens for irradiating laser light onto the optical disc or transmitting return light from the optical disc. The second optical head unit is arranged in parallel with the first optical head unit. The first and second optical head units are loaded on the thread, and the first and second optical head units are moved in a radial direction of the optical disc in parallel with the optical disc. The first servo control unit performs control of the rotation drive unit, and controls the position of the object lens of the first optical head unit on the thread. The second servo control unit controls the position of the object lens of the second optical head unit on the thread. The first system controller determines the first recording power calibration start address as an address at which the first optical head unit starts the recording power calibration out of the power calibration area provided in advance as an area for calibrating the recording power of the laser light. In addition, the determined first recording power calibration start address is supplied to the first servo control unit. The second system controller determines the address obtained by adding the range of the power calibration area used to calibrate the recording power to the first recording power calibration start address as the second recording power calibration start address as an address at which the second optical head unit starts the recording power calibration. In addition, the determined second recording power calibration start address is supplied to the second servo control unit.

As a result, the second system controller performs control such that the power calibration work starts from the address obtained by adding the range of the power calibration area used to calibrate the recording power to the first recording power calibration start address. That is, in the optical disc recording apparatus having a plurality of optical head units, the area used in the power calibration is not overlapped by the first and second optical head units.

According to the embodiments of the present disclosure, the area used in the power calibration is not overlapped between the first and second optical head units. Therefore, the recording power calibration can be simultaneously executed for both the first and second optical head units. As a result, the time taken for the recording power calibration can be reduced. In addition, the area used in the power calibration is not overlapped between the first and second optical head units. Therefore, the first and second optical head units do not overwrite the same portion on the optical disc. That is, it is possible to compute the optimum power value with high precision.

BRIEF DESCRIPTION OF THE DRAWINGS

FIGS. 13A and 13B are explanatory diagrams illustrating an exemplary method of determining the OPC start address in a certain channel according to the first modification of the present disclosure.

FIG. 16 is a block diagram illustrating an exemplary configuration of the optical disc recording apparatus according to the second modification of the present disclosure.

DETAILED DESCRIPTION

Hereinafter, embodiments of the present disclosure will be described.

The present disclosure may be applied to an optical disc recording apparatus having a plurality of optical heads, in which such heads can be simultaneously operated on a single disc in order to obtain a high bit rate of the recording/reproduction. Description will be made in the following sequence.

1. First Embodiment (two optical head units are provided on the same thread)
2. First Modification (four optical head units are provided on the same thread)
3. Second Modification (two optical head units are loaded on each of two threads)

1. First Embodiment

Two Optical Head Units are Provided on the Same Thread

[Exemplary Configuration of Entire System]

Figure 1A:
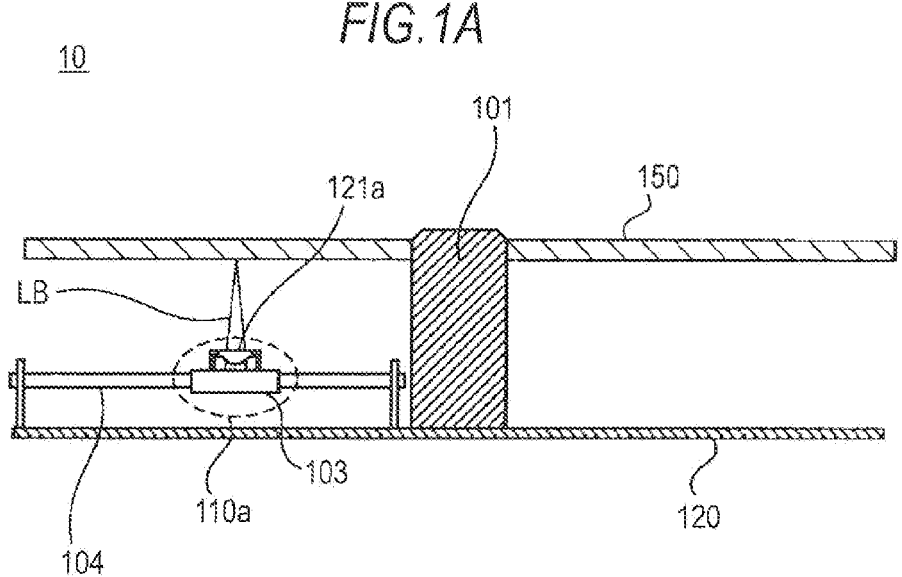
FIGS. 1A and 1B are a side view and a top view, respectively, illustrating an exemplary configuration of an optical disc recording apparatus according to an embodiment of the present disclosure.
Figure 1B:
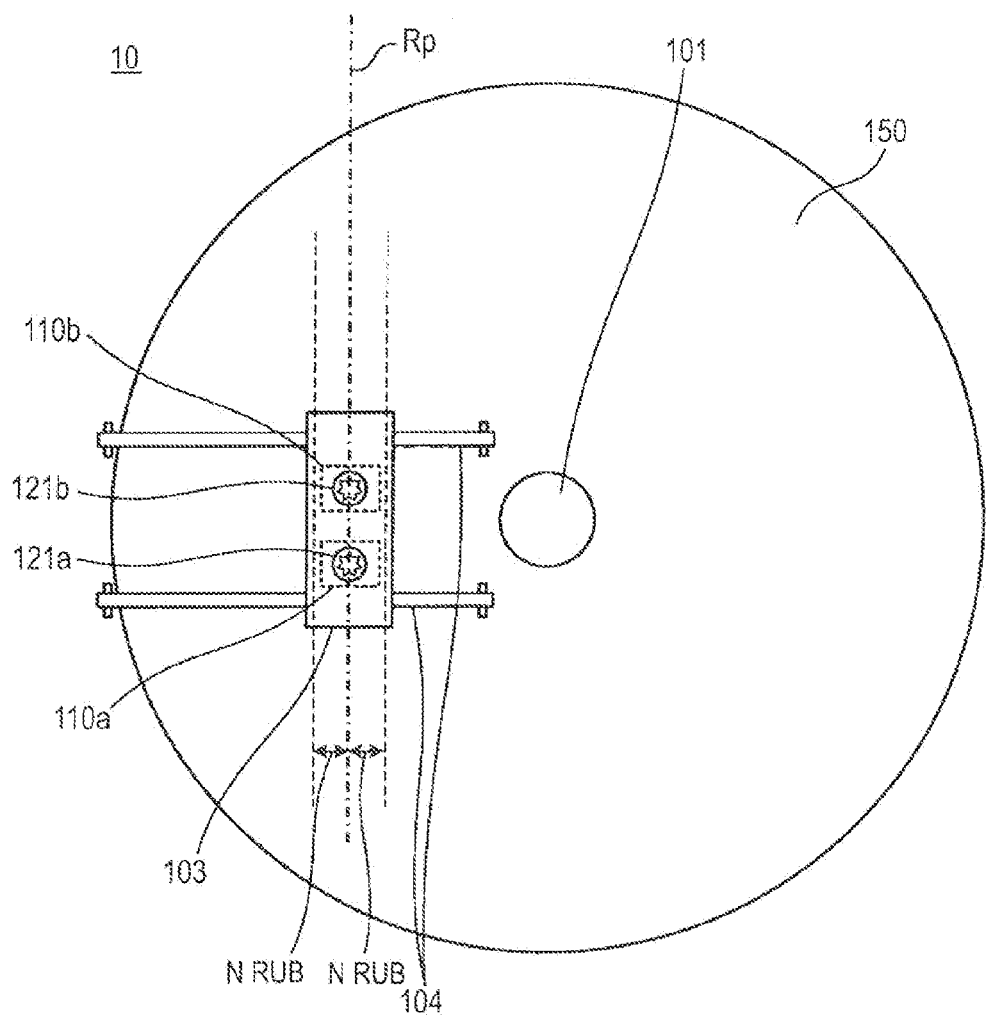

FIGS. 1A and 1B illustrate an exemplary configuration of an optical disc recording apparatus 10 according to an embodiment of the present disclosure. The optical disc recording apparatus 10 shown in FIGS. 1A and 1B writes information by irradiating laser light onto a loaded optical disc 150. The optical disc 150 is a writable optical disc. Although a case where the optical disc 150 is a Blu-ray (registered trademark) is exemplarily described in the present embodiment, the present disclosure may be applied to other types of specifications such as a compact disc (CD) or a digital versatile disc (DVD) without limitation.

FIG. 1A is a side view illustrating the optical disc recording apparatus 10. As shown in FIG. 1A, the optical disc recording apparatus 10 includes a pedestal 120, a spindle motor 101 (rotation drive unit) for rotating the loaded optical disc 150, and an optical head unit 110a for irradiating laser light onto the optical disc 150. Although only a single optical head unit 110a is illustrated in FIG. 1A, it is regarded that another optical head unit 110b is arranged in the depthwise direction of the drawing. In FIG. 1A, for the purpose of simple description, only the optical head unit 110a will be described.

The optical head unit 110a has an object lens 121a. The object lens 121a condenses the laser light output from a laser light output unit (not shown) and outputs the condensed light to the optical disc 150. In addition, the optical head unit 110a having the object lens 121a is loaded on a thread 103. The thread 103 is movably installed along a axis 104. The axis 104 has a length corresponding to a radius of the optical disc 150. As the thread 103 is driven under control of a servo control unit (not shown), the optical head unit 110a loaded on the thread 103 moves along the axis 104 in the radial direction of the optical disc 150. In the optical disc recording apparatus 10 configured in this manner, the laser light output from the optical head unit 110a is irradiated onto the circumference of the optical disc 150 while the optical disc 150 is rotated using the spindle motor 101a. In addition, all tracks from the inner periphery to the outer periphery are traced by moving the thread 103 along the axis 104.

Figure 21:
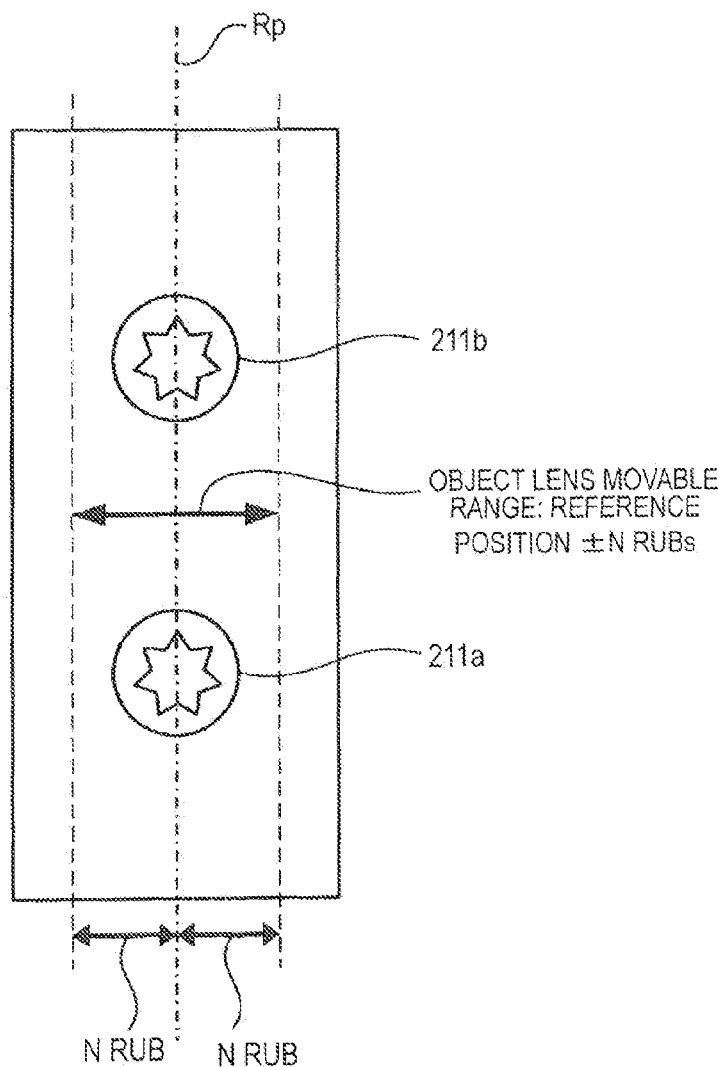
FIG. 21 is a top view illustrating an exemplary movable range of an object lens of the related art.

FIG. 1B is a top view illustrating an optical disc recording apparatus 10. Referring to FIG. 13, the optical head unit 110a and the optical head unit 110b are arranged on the thread 103 in parallel in the circumferential direction of the optical disc 150. In FIG. 13, the object lens 121a included in the optical head unit 110a and an object lens 121b included in the optical head unit 110b are illustrated in a circular shape, and an image of the laser light irradiated from each object lens 121a (121b) is illustrated in a star shape. The thread 103 moves in parallel with the optical disc 150 in the radial direction of the optical disc 150 along the axis 104 as described in conjunction with FIG. 1A. In addition, the optical lenses 121a and 121b are configured to independently move on the thread 103 as in the example of the related art described in conjunction with FIG. 21. That is, the optical lenses 121a and 121b independently move by ±N RUBs in a radial direction of the optical disc 150 with respect to the reference position Rp indicated as a one-dotted dashed line on the thread 103. That is, the optical lenses 121a and 121b can be operated while they are separated with a maximum distance of 2N RUBs.

Figure 2:
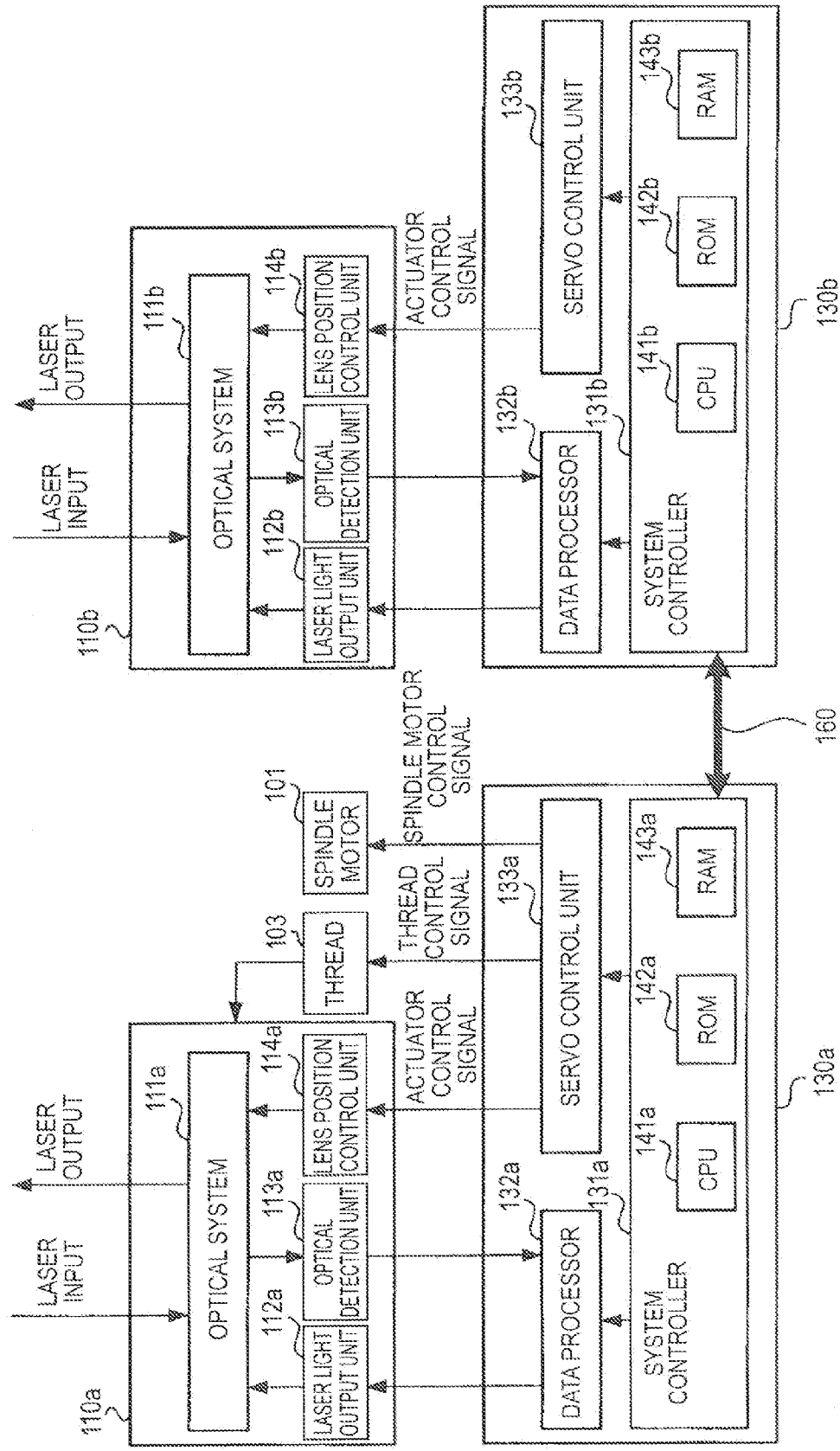
FIG. 2 is a block diagram illustrating an exemplary configuration of the optical disc recording apparatus according to an embodiment of the present disclosure.

FIG. 2 is a block diagram illustrating in detail the optical head units 110a and 110b and the control units 130a and 130b for controlling them. Similarly, in the following description, the channel chA denotes a processing channel of the signal treated in the optical head unit 110a side, and the channel chB denotes a processing channel of the signal treated in the optical head unit 110b side. First, their configurations are described in the sequence of the optical head units 110a and the control unit 130a from the channel chA side.

The optical head unit 110a includes an optical system 111a, a laser light output unit 112a, an optical detection unit 113a, and a lens position control unit 114a. The optical system 111a includes the object lens 121a (not shown in FIG. 2), a beam splitter, a mirror, and the like. In addition, the laser light output from the laser light output unit 112a is condensed by the object lens and irradiated onto the optical disc 150 (not shown), and the return light from the optical disc 150 is input to the optical detection unit 113a. The laser light output unit 112a includes a laser diode, and the like. The laser light output unit 112a converts the digital data supplied from the control unit 130a into the optical signal (laser light) and outputs the optical signal to the optical system 111a. The data is written to the optical disc 150 by irradiating the laser light onto the optical disc 150 using the optical system 111a. In addition, the laser light output unit 112a outputs the laser light adjusted to the read power to the optical system 111a. The read power refers to the power of the emitted light to read information recorded on the optical disc 150, and the power thereof is controlled by the system controller 131a of the control unit 130a.

The optical detection unit 113a extracts the return light from the optical disc 150 of the laser light adjusted to the read power as an optical signal, converts the optical signal into an electric signal, and supplies the signal to a data processor 132a of the control unit 130a. As a result, the data recorded on the optical disc 150 is read to the optical disc recording apparatus 10. The lens position control unit 114a is an actuator for controlling the position of the object lens 121a. The irradiation position of the laser light irradiated onto the optical disc 150 is adjusted by controlling the position of the object lens 121a using the lens position control unit 114a.

Next, a configuration of the control unit 130a will be described. The control unit 130a includes a system controller 131a, the data processor 132a, and a servo control unit 133a. The system controller 131a controls the operations of each unit in the optical disc recording apparatus 10. The system controller 131a has a central processing unit (CPU) 141, a read-only memory (ROM) 142, and a random access memory (RAM) 143. The CPU 141 executes various processes according to a program stored in the ROM 142 or a program loaded on the RAM 143 to control the operations of each unit in the optical disc recording apparatus 10. In addition, the RAM 143 appropriately stores the data necessary for the CPU 141 to execute various processes.

The data processor 132a is controlled by the system controller 131a to process the information by using, the information read from the optical disc 150 or the information written to the optical disc 150 as a processing target. The servo control unit 133a controls the rotational driving of the spindle motor 101 (refer to FIGS. 1A and 1B) under control of the system controller 131a. In addition, the servo control unit 133a generates an actuator control signal under control of the system controller 131a and supplies the actuator control signal to the lens position control unit 114a. The data processor 132a is controlled by the system controller 131a and also controls the position of the thread 103.

The optical head unit 110b and the control unit 130b in the channel chB side also have the same functions as those of the channel chA side. Therefore, detailed description thereof will not be repeated. However, since only a single spindle motor 101 is present in the drive, a configuration for controlling the spindle motor 101 (function of the servo control unit) is provided only in the channel chA side. That is, such a configuration is not present in the channel chB side. In addition, a configuration for moving the thread 103 out of the functions of the servo control unit is also provided only in the channel chA side. The system controller 131a of the channel chA and the system controller 131b of the channel chB are connected to each other using an inter-channel communication unit 160 such as bidirectional serial communication.

[Description of Method of Determining OPC Start Address]

In the optical disc recording apparatus 10 configured in this manner, the OPC, which is a calibration process, is performed before the writing process such that the laser emission power during the writing has an optimum value. The control of the OPC is performed by the system controllers 131a and 131b. A basic flow of the OPC sequence is as follows.

(1) Perform writing on the optical disc 150 with the power adjusted for the OPC evaluation by a predetermined number of RUBs from the OPC start address designated by the system controller 131a (131b);

(2) Read the written portion; and (3) Compute the optimum write power using the system controller 131a (131b) based on the amplitude of the radio frequency (RF) signal that has been read. If the optimum write power is found, the OPC convergence is assumed.

The system controller 131a (131b) performs setting of the power necessary to execute the OPC for the optical head unit 110a (110b). An instruction signal for instructing a recording start timing or a power switching timing necessary to execute the OPC or write data are supplied by the data processor 132a (132b). In addition, the write data corresponds to the signal written to the optical disc 150 in practice. The write data is supplied to the laser light output unit 112a in the optical head unit 110a (110b) through a write strategy circuit WS (not shown). An amplitude evaluation function of the reproduction RF signal necessary to execute the OPC is integrated to the data processor 132a (132b). As the timing is received from the data processor 132a (132b), the system controller 131a (131b) controls each unit to obtain the evaluated amplitude data at an appropriate timing. The system controller 131a (131b) performs processing for the data obtained in this manner and executes control for the entire sequence of the OPC such as determination of whether or not there is OPC convergence or computation of the convergence value. As described above, both the object lens 121a of the channel chA and the object lens 121b of the channel chB are movable in the radial direction independently by a certain distance. That is, both object lenses are separately movable at a maximum interval of 2N RUBs. In addition, the number of RUBs necessary in a single try of the OPC (=the range of the area used in the power calibration) is set to 6 RUBs.

Next, a method of determining the OPC start address according to the present embodiment will be described with reference to the flowchart of FIG. 3, in which the number of optical head units is set to 2. First, the system controller 131a of the channel chA determines the OPC start address (first recording power calibration start address) for the channel chA (step A1). The OPC start address is determined by selecting the value generated using a random number out of the area obtained as the power calibration area. On a Blu-ray disc, the power calibration area is defined in a predetermined position on the inner peripheral side of the disc and continuously extends across 2048 RUBs. The address in the power calibration area in this case becomes 0 to 2047 in the unit of RUBs. If the number of RUBs necessary in the OPC is set to 6 RUBs, the range that may be used by the channel chA as the OPC start address extends across 0 to 2042(=2047−6+1).

Subsequently, the system controller 131a of the channel chA transmits the OPC start command and the OPC start address for the channel chA through the inter-channel communication unit 160 to the channel chB (step A2). The system controller 131a of the channel chA determines the minimum RUB minR and the maximum RUB maxR in the area available in the OPC. As the area available in the OPC (recording power calibration area), the range centered at the OPC start address for the channel chA with a margin of ±N RUBs is selected. As shown in FIG. 1B, the object lens 121a of the channel chA and the object lens 121b of the channel chB are movable around the range centered at the reference position Rp with a margin of ±N RUBs. Therefore, both the object lens 121a and the object lens 121b can be simultaneously operated within the available area determined in this manner. If there is no OPC convergence and a retry is attempted (hereinafter, referred to as a retry), a retry start address is also selected from the available area.

Figure 4:
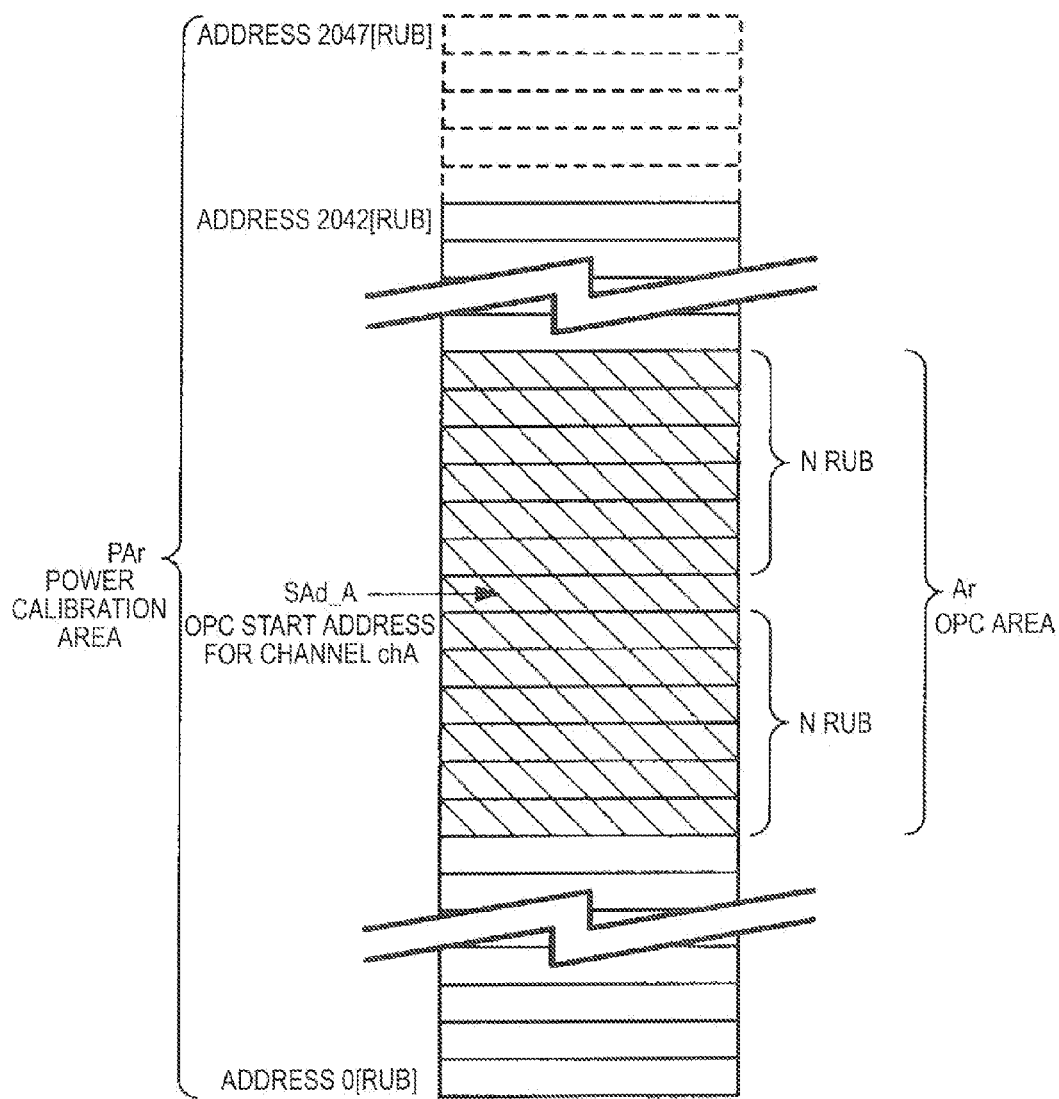
FIG. 4 is an explanatory diagram illustrating an exemplary method of determining the OPC area according to an embodiment of the present disclosure.

FIG. 4 illustrates an exemplary area Ar (hereinafter, referred to as an OPC area) available in the OPC of the channel chA. In FIG. 4, out of the range of the addresses 0 to 2042 RUBs in a power calibration area PAr, the range centered at an OPC start address SAd_A for the channel chA with a margin of ±N RUBs is selected as the OPC area Ar.

Figure 5:
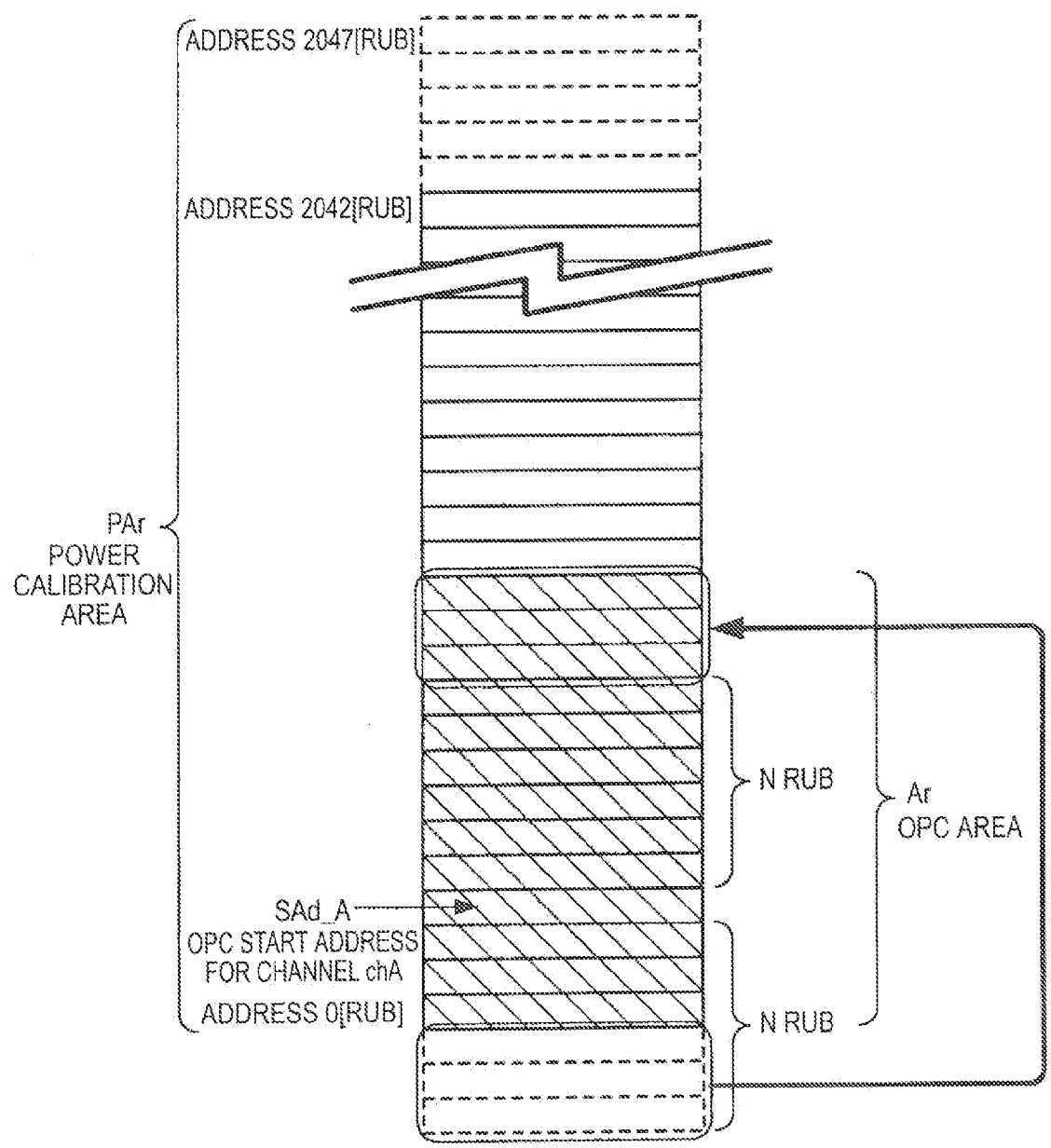
FIG. 5 is an explanatory diagram illustrating an exemplary method of determining the OPC area when the range of the OPC area according to an embodiment of the present disclosure downwardly exceeds the lower limit of the power calibration area.
Figure 6:
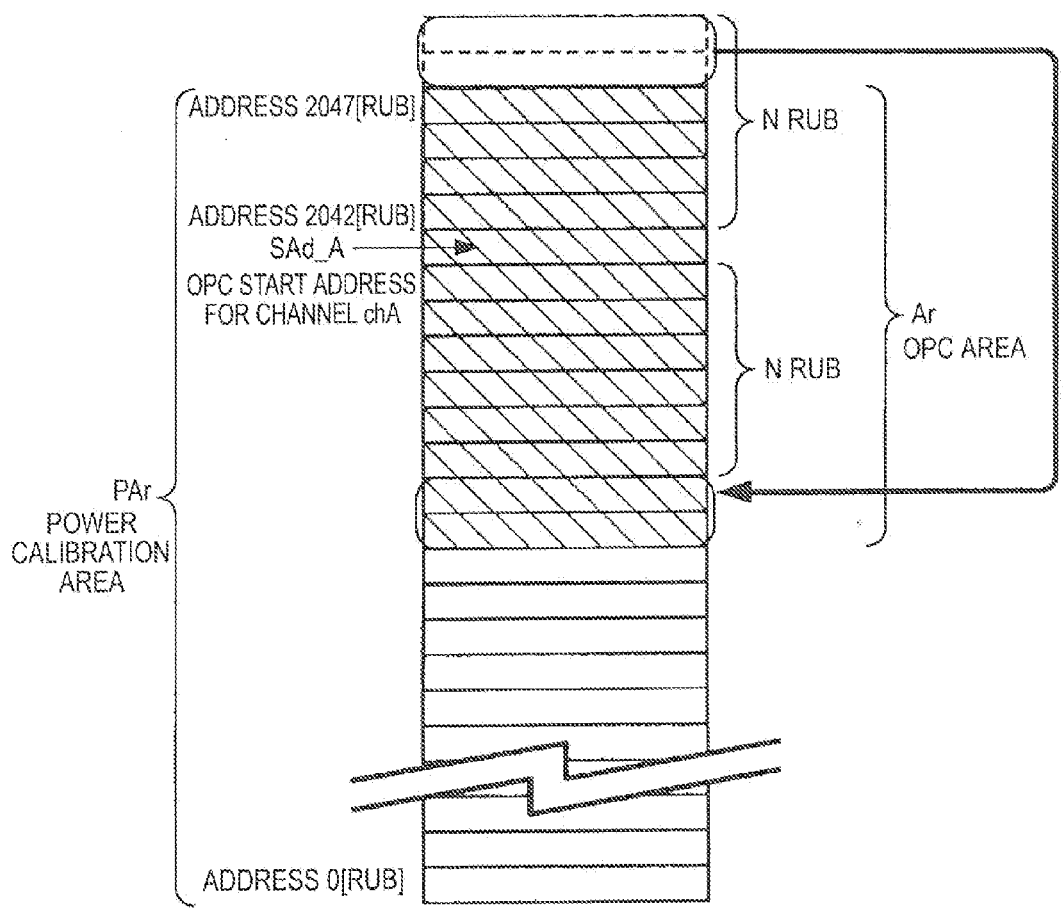
FIG. 6 is an explanatory diagram illustrating an exemplary method of determining the OPC area when the range of the OPC area according to an embodiment of the present disclosure upwardly exceeds the upper limit of the power calibration area.

Since the OPC start address SAd_A is determined based on a random number, the OPC area Ar determined by using the OPC start address SAd_A as a center may exceed the power calibration area PAr. FIGS. 5 and 6 illustrate a method of determining the OPC area Ar in this case.

FIG. 5 illustrates an example in which the OPC area Ar downwardly exceeds the lower limit (address 0(RUB)) of the power calibration area PAr. Such a case may occur when the OPC start address SAd_A is set in the vicinity of the address 0. In this case, the RUBS downwardly exceeding the address 0 are returned and arranged on the position of the OPC start address SAd_A+N RUBs. As a result, the same area (=2N+1RUB) as that of the range of the OPC start address SAd_A±N RUBs for the channel chA can be obtained to extend continuously in total.

Figure 7:
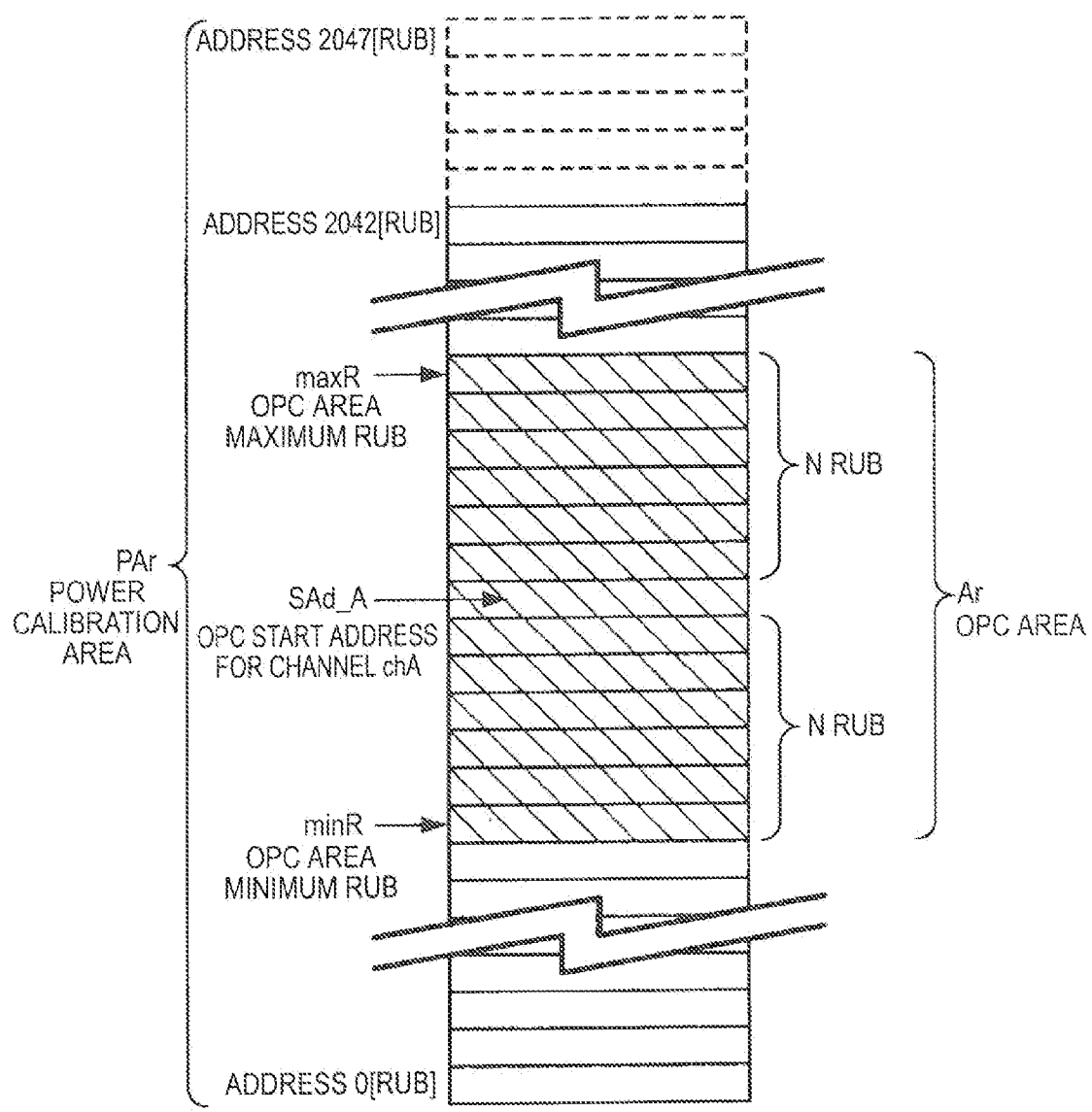
FIG. 7 is an explanatory diagram illustrating an example of determining a minimum RUB minR and a maximum RUB maxR in the OPC area according to an embodiment of the present disclosure.

FIG. 6 illustrates an example in which the OPC area Ar upwardly exceeds the upper limit (address 2047(RUB)) of the power calibration area PAr. Such a case may occur when the OPC start address SAd_A is set in the vicinity of the address 2047. In this case, the RUBs upwardly exceeding the address 2047 are returned and arranged under the position of the OPC start address SAd_A−N RUBs. As a result, it is possible to obtain the same area (=2N+1 RUB) as that of the range of the OPC start address SAd_A±N RUBs for the channel chA, which continuously extends, in total. If the OPC area Ar is determined in this way, the minimum RUB minR and the maximum RUB maxR in the OPC area are also automatically determined as shown in FIG. 7.

Figure 3:
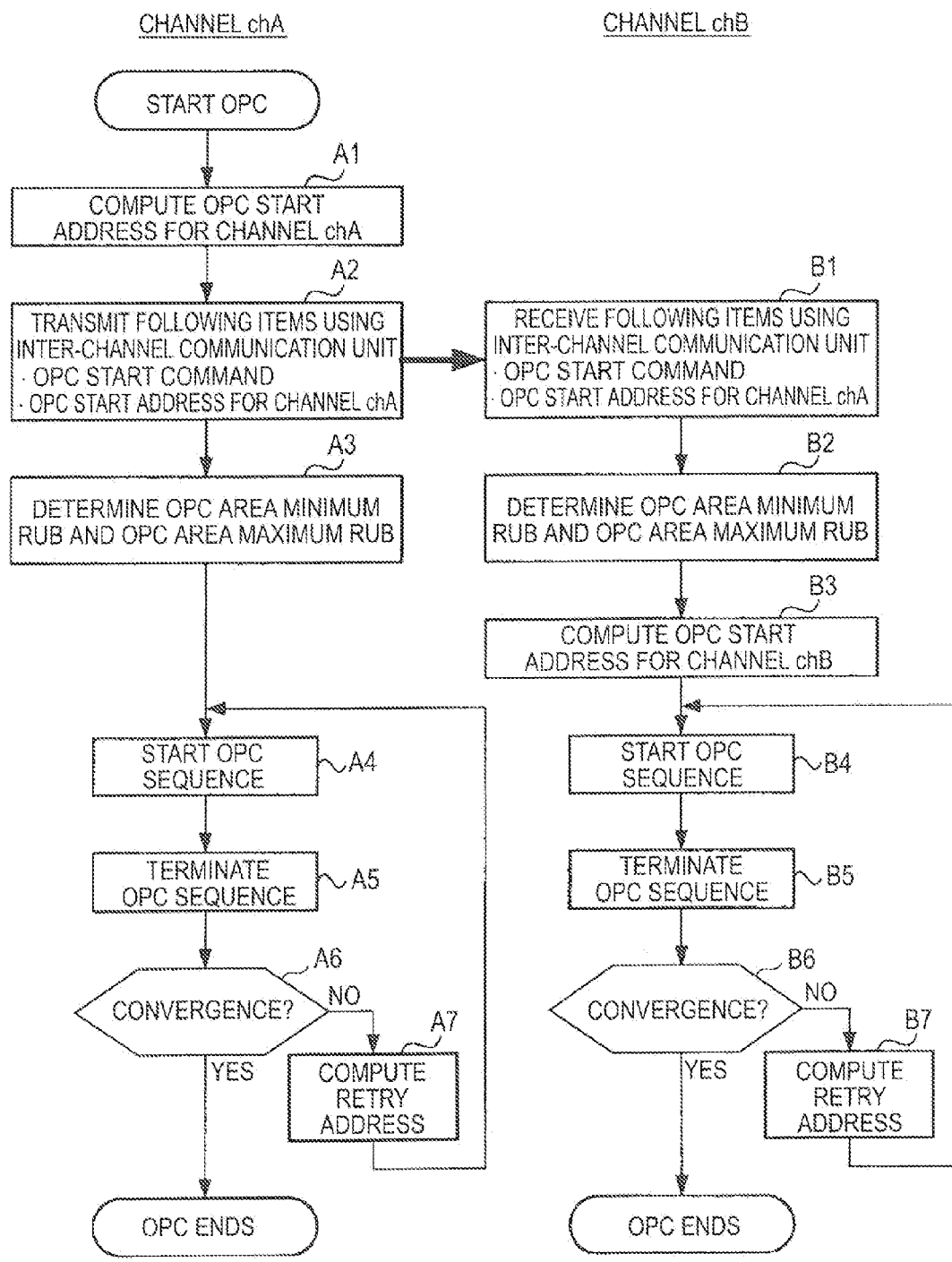
FIG. 3 is a flowchart illustrating an exemplary method of determining an OPC start address according to an embodiment of the present disclosure.

Description will be continued by returning to the flowchart of FIG. 3. In the channel chA, after the OPC area minimum RUB minR and the OPC area maximum RUB maxR are determined in step A3, the OPC sequence is initiated (step A4). That is, the OPC is initiated using the OPC start address SAd_A for the channel chA computed in step A1. Then, if the OPC sequence is terminated (step A5), it is determined whether or not there is OPC convergence (step A6). If it is determined that there is OPC convergence, the OPC is completed. If it is determined that there is no OPC convergence, a retry address is computed (step A7), and the process is returned to step A4 and is continued. The process of computing the retry address will be described below with reference to FIGS. 8 and 9.

The system controller 131b of one channel chB first receives the OPC start command transmitted from the channel chA side and the OPC start address SAd_A for the channel chA (step B1). Then, the OPC area minimum RUB minR and the OPC area maximum RUB maxR are computed based on the received OPC start address SAd_A for the channel chA (step B2). That is, in the same sequence as that described in step A3, the OPC area Ar is computed. The value of the OPC start address SAd_A for the channel chA is one, and the same computation is performed using the same value. Therefore, the minimum RUB minR and the maximum RUB maxR in the OPC area Ar naturally have the same values as those computed in step A3.

In this manner, by computing the OPC area in both the channel chA side and the channel chB side, the number of times of communication in the inter-channel communication unit 160 (refer to FIG. 2) can be reduced. In addition, if the overhead of the system controller 131a (131b) caused by the inter-channel communication unit 160 is insignificant, the values of the OPC area minimum RUB minR and the OPC area maximum RUB maxR computed for the channel chA in step A3 may be transmitted to the channel chB. In addition, step B2 of the channel chB side may be omitted.

Subsequently, the system controller 131b for the channel chB determines an OPC start address SAd_B (second recording power calibration start address) for the channel chB (step B3).

The computation of the OPC start address SAd_B for the channel chB is performed using the following Equation 1.

$$\text{OPC start address } SAd\_B \text{ for channel } chB = \text{OPC start address } SAd\_A \text{ for channel } chA + 6(RUB) \quad \text{(Equation 1)}$$

Figure 22:
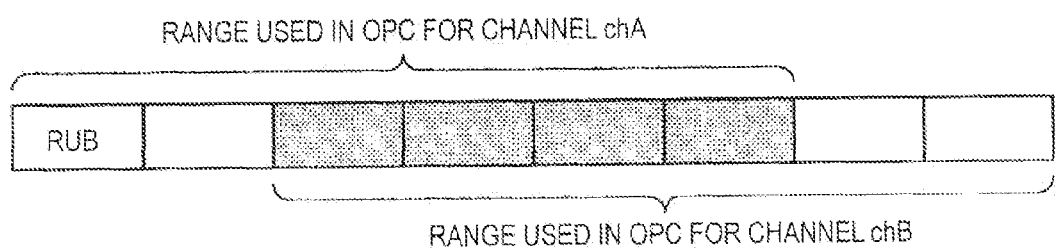
FIG. 22 is an explanatory diagram illustrating an exemplary case where the usage range of the OPC overlaps and interferes between two channels in the related art.

That is, the start address SAd_B for the channel chB is delayed from the OPC start address SAd_A for the channel chA by 6 RUBS necessary in a single OPC operation. As a result, it is possible to prevent a problem of the OPC operation areas overlapping and interfering between both channels as shown in FIG. 22 as an example of the related art.

However, in a case where an OPC end address EAd_B for the channel chB is larger than the OPC area maximum RUB maxR, the channel chB is deviated from the OPC area Ar during the OPC operation. Therefore, it is necessary to compute the OPC start address SAd_B for the channel chB again. The OPC end address EAd_B for the channel chB can be obtained by adding 5 RUBs to the OPC start address SAd_B for the channel chB.

That is, if OPC start address SAd_B for the channel chB+ 5(RUB)>OPC area maximum RUB maxR, it is necessary to compute the OPC start address SAd_B for the channel chB again using the following Equation 2.

$$\text{OPC start address } SAd\_B \text{ for channel } chB = \text{OPC start address } SAd\_A \text{ for channel } chA - 6(RUB) \quad \text{(Equation 2)}.$$

Subsequently, the system controller 131b for the channel chB initiates the OPC using the OPC start address SAd_B for the channel chB (step B4). If the OPC sequence is terminated (step B5), it is determined whether or not there is OPC convergence (step B6). If it is determined that there is OPC convergence, the OPC is completed. If it is determined that there is no OPC convergence, the retry address is computed (step B7), and the process returns to step B4, and is continued.

[Description of Method of Determining Retry Address]

Next, a method of computing the retry address performed in steps A7 and B7 of FIG. 3 will be described. In general, in the case of having a retry when there is no OPC convergence, it is highly likely that there is a defect on the disc within the range used in the previous OPC. For this reason, a retry address (hereinafter, referred to as a retry start address) is different from the address used in the previous try.

Figure 8:
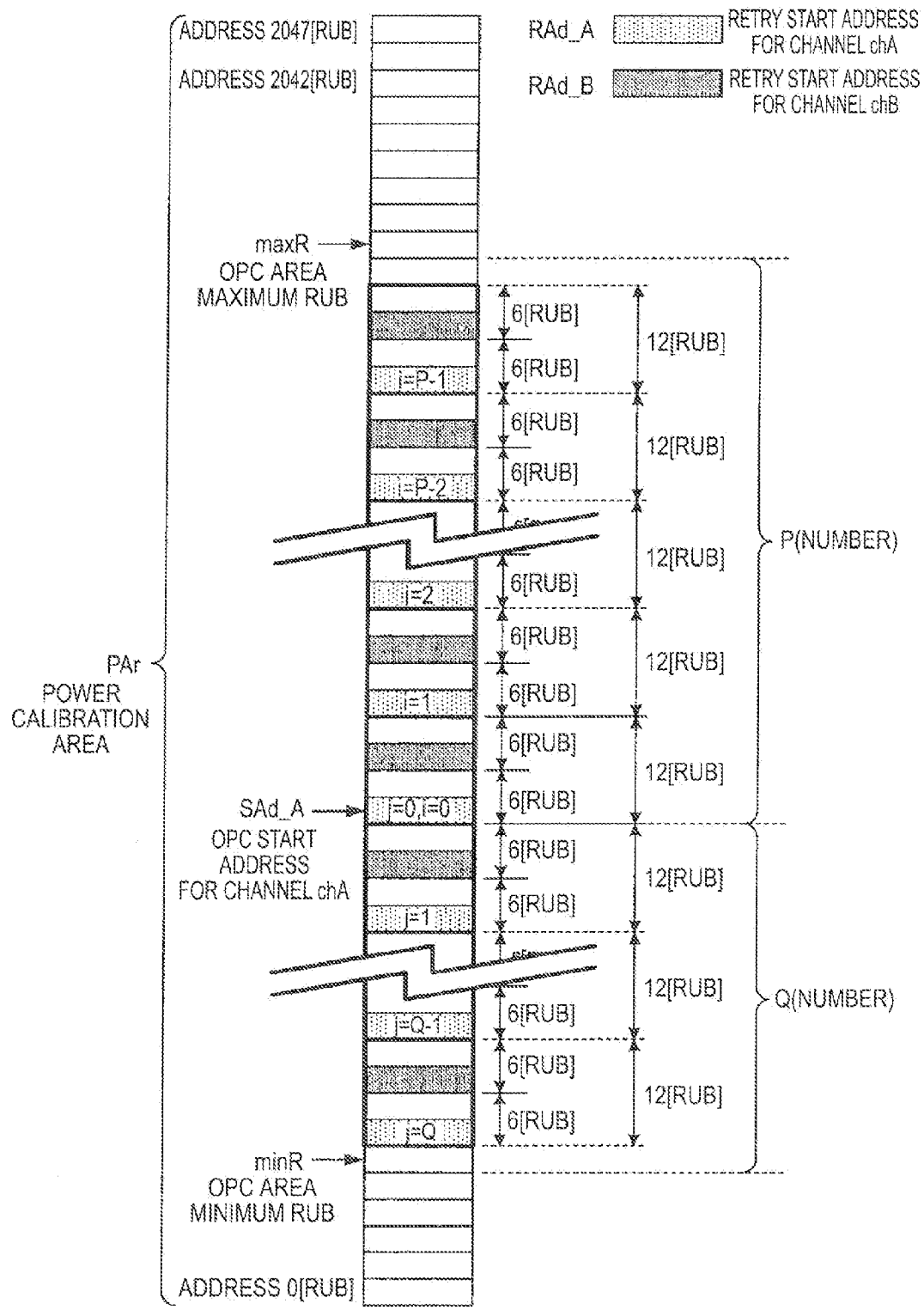
FIG. 8 is an explanatory diagram illustrating an example of determining a retry start address according to an embodiment of the present disclosure.

FIG. 8 illustrates an exemplary address able to be set as the retry start address. In FIG. 8, the addresses that may be selected as a retry start address RAd_A for the channel chA are coarsely dotted, and the addresses that may be selected as a retry start address RAd_B for the channel chB are densely dotted. The retry start address RAd_A for the channel chA may be set to the position corresponding to the OPC start address SAd_A in each group of 12 RUBs with respect to the OPC start address SAd_A of the channel chA. That is, the retry start address RAd_A for the channel chA is set to the position obtained by adding a multiple of 12 to the OPC start address SAd_A or the position obtained by subtracting a multiple of 12 from the OPC start address SAd_A. Here, the value "12" is a sum of 6, which is the number of RUBs used in the OPC for the channel chA, and 6, which is the number of RUBs used in the OPC for the channel chB.

The retry start address RAd_A may be computed in the following sequence.

(sequence-1) Obtain the number P of groups of 12 RUBs included in the range equal to or higher than the OPC start address SAd_A and lower than the OPC area maximum RUB maxR and the number Q of groups of 12 RUBs included in the range equal to or higher than OPC area minimum RUB minR and lower than OPC start address SAd_A.

(Hereinafter, the range equal to or higher than OPC start address SAd_A and lower than the OPC area maximum RUB maxR will be referred to as an "upper side of the OPC start address SAd_A," and the range equal to or higher than OPC area minimum RUB minR and lower than OPC start address SAd_A will be referred to as a "lower side of the OPC start address SAd_A."

(sequence-2) Generate a random number within the range defined by the group numbers P and Q computed in the (sequence-1).

(sequence-3) Determine the retry start address RAd_A based on the random number generated in the (sequence-2).

First, the group number Q of the 12 RUBs in the lower side of the OPC start address SAd_A is computed using the sequence shown in the (sequence-1). In order to compute the group number Q, first, the address that can be set as the retry start address RAd_A in the lower side of the OPC start address SAd_A will be considered. The following Equation 3 is to compute the address that can be set as the retry start address RAd_A in the lower side of the OPC start address SAd_A.

$$\text{address that can be set as the retry start address } RAd\_A = OPC \text{ start address } SAd\_A - 12j \quad \text{(Equation 3)}$$

The variable j is a variable for designating a specific location (address) in the lower side of the OPC start address SAd_A and may be substituted with any natural number equal to or greater than zero. As shown in FIG. 8, in the case of variable j=0, the computation result of Equation 3 becomes equal to the OPC start address SAd_A. In addition, the maximum value of the variable j becomes a maximum number of the groups of the 12 RUBs, that is, equal to the group number Q. That is, in (sequence-1), the maximum number (=group number Q) obtained using the variable j in the OPA area Ar (in the lower and upper sides of the OPC start address SAd_A) is computed. The group number Q of 12 RUBs in the lower side of the OPC start address SAd_A can be computed using the following Equation 4.

$$\text{group number } Q \text{ of } 12 \text{ } RUBs = (OPC \text{ start address } SAd\_A - OPC \text{ area minimum } RUB \text{ } minR)/12 \quad \text{(Equation 4)}$$

Next, the group number P of 12 RUBs in the upper side of the OPC start address SAd_A is computed. Similar to the method used for the lower side of the OPC start address SAd_A, first, the address that can be set as the retry start address RAd_A in the upper side of the OPC start address SAd_A will be considered. The address that can be set as the retry start address RAd_A in the upper side of the OPC start address SAd_A can be computed using the following Equation 5.

$$\text{address that can be set as retry start address } RAd\_A = OPC \text{ start address } SAd\_A + 12i \quad \text{(Equation 5)}$$

The variable i is a variable for designating a specific address in the upper side of the OPC start address SAd_A and is substituted with a natural number equal to or greater than zero. As shown in FIG. 8, if variable i=0, the computation result of the Equation 5 becomes equal to the OPC start address SAd_A. In addition, the maximum value of the variable i is equal to the group number P−1. The group number P of 12 RUBs in the upper side of the OPC start address SAd_A can be computed using the following Equation 6.

$$\text{group number } P \text{ of } 12 \text{ } RUBS = (OPC \text{ area maximum } RUB \text{ } maxR - OPC \text{ start address } SAd\_A)/12 \quad \text{(Equation 6)}$$

In addition, according to the present embodiment, although the group number of 12 RUBs is computed for the lower and upper sides of the OPC start address SAd_A in this order, the computation sequence is not limited thereto. The computation may be made first for the upper side of the OPC start address SAd_A.

Subsequently, as shown in (sequence-2), the random number is generated within the range defined by the group numbers P and Q. The random number is a random number for determining the retry start address RAd_A. The random number k is generated from the range −Q≦k≦P−1. In addition, as shown in (sequence-3), the retry start address RAd_A is determined based on the following Equation 7 using the generated random number.

$$\text{retry start address } RAd\_A = OPC \text{ start address } SAd\_A + 12k \quad \text{(Equation 7)}$$

Then, the retry start address RAd_B for the channel chB is computed based on the retry start address RAd_A for the channel chA computed in this way. The retry start address RAd_B can be computed by first generating the random number from the range −Q≦k≦P−1 and applying the random number to the following Equation 8.

$$\text{retry start address } RAd\_B = OPC \text{ start address } SAd\_A + 12k + 6 \quad \text{(Equation 8)}$$

That is, a location deviated by 6 RUBs from the retry start address RAd_A for the channel chA is determined as the retry start address RAd_B. In addition, since the random number k is independently generated by each system controller 131*a* (131*b*) in both the channel sides chA and chB, the value of the random number k may be different between the channels chA and chB.

According to the embodiment described above, the OPC start address SAd_B for the channel chB is set to be delayed by the number of RUBs (6 RUBS in the present embodiment) necessary in a single try of the OPC operation with respect to the OPC start address SAd_A for the channel chA. As a result, it is possible to prevent the area used in the OPC from overlapping and interfering between both channels chA and chB. Therefore, since the system controllers 131*a* and 131*b* of the channels chA and chB can simultaneously perform the OPC, it is possible to reduce a start-up time.

According to the embodiment described above, the channel chA retry start address RAd_A is determined from an address at every 12 RUBs from OPC start address SAd_A for the channel chA. The channel chB retry start address RAd_B is determined from an address at every 12+6 RUBs from the OPC start address SAd_A for the channel chA. Furthermore, such retry start addresses RAd_A and RAd_B are selected from the movable ranges of both object lenses 121*a* (121*b*), that is, from the range between the OPC area minimum RUB minR and the OPC area maximum RUB maxR. As a result, even when both channels simultaneously perform the OPC retry, the OPC operation does not interfere between both channels. Therefore, it is possible to simultaneously start the retry in both channels chA and chB and further reduce the time for the OPC sequence including the retry.

According to the embodiment described above, the retry start address can be independently determined for each system controller 131a (131b) of both channels. That is, it is possible to reduce a cumbersome work for checking the retry start address of the counterpart using the inter-channel communication unit 160. That is, in comparison with a case where such a cumbersome checking is performed, the overhead caused by communication can be reduced in each channel. Therefore, it is possible to reduce the time for the OPC sequence including the retry.

2. Modification 1

Exemplary Configuration Having Four Optical Head Units on the Same Thread

Next, a case where the number of optical head units is four will be described. Basically, this case is considered to be similar to a case where the number of optical heads is 2 described hereinbefore. Although the number of optical head units is exemplarily set to 4 in the following description, the embodiment may be similarly applied to other cases where the number of optical head units is not set to 4.

Figure 9:
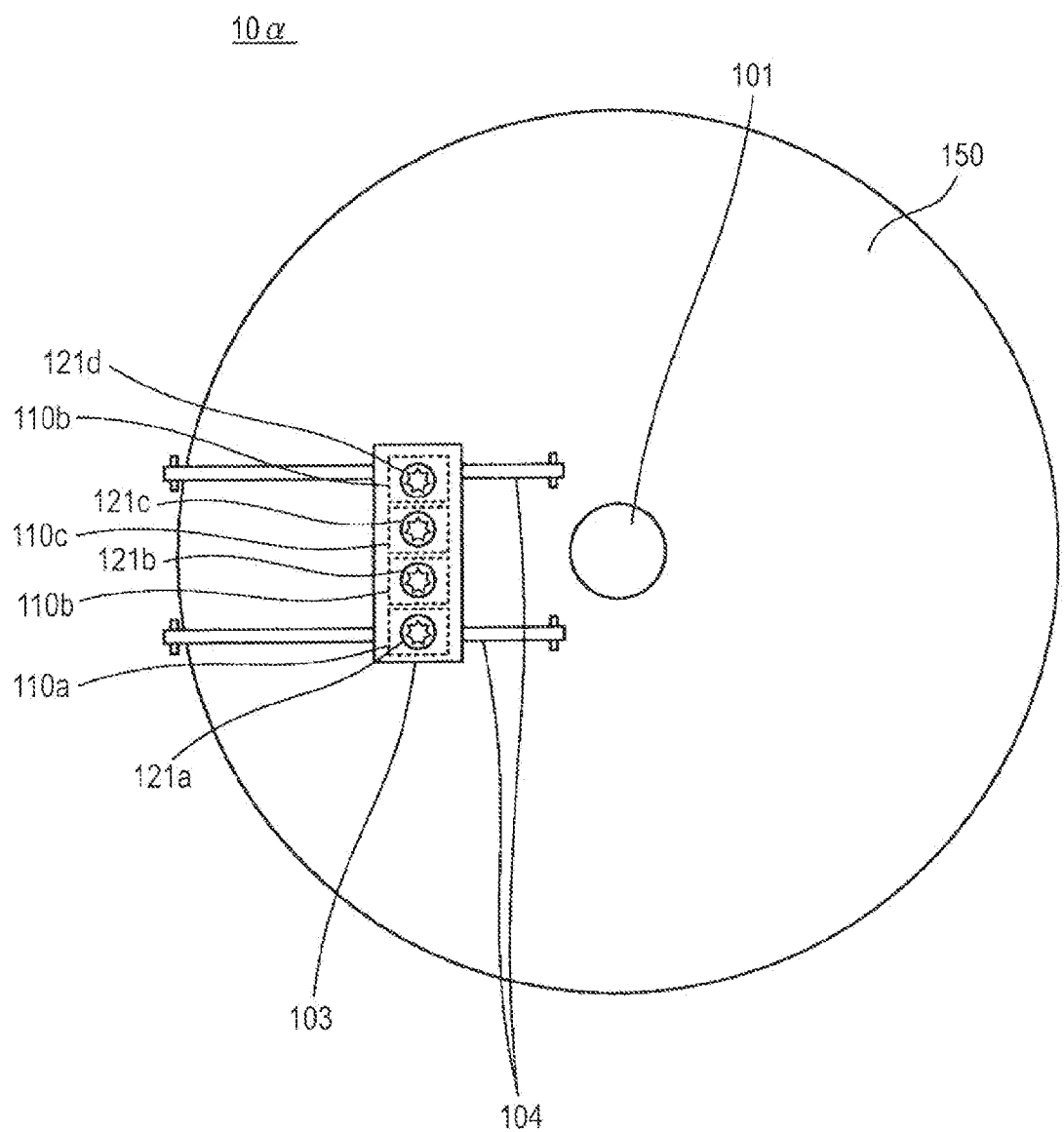
FIG. 9 is a top view illustrating an exemplary configuration of an optical disc recording apparatus according to a first modification of the present disclosure.

FIG. 9 illustrates an exemplary configuration of an optical disc recording apparatus 10α according to the present embodiment. In FIG. 9, like reference numerals denote like elements as in FIGS. 1A and 1B, and description thereof will not be repeated. As shown in FIG. 9, four optical head units including the optical head units 110a to 110d for the channels chA to chD, respectively, are loaded on the thread 103.

Figure 10:
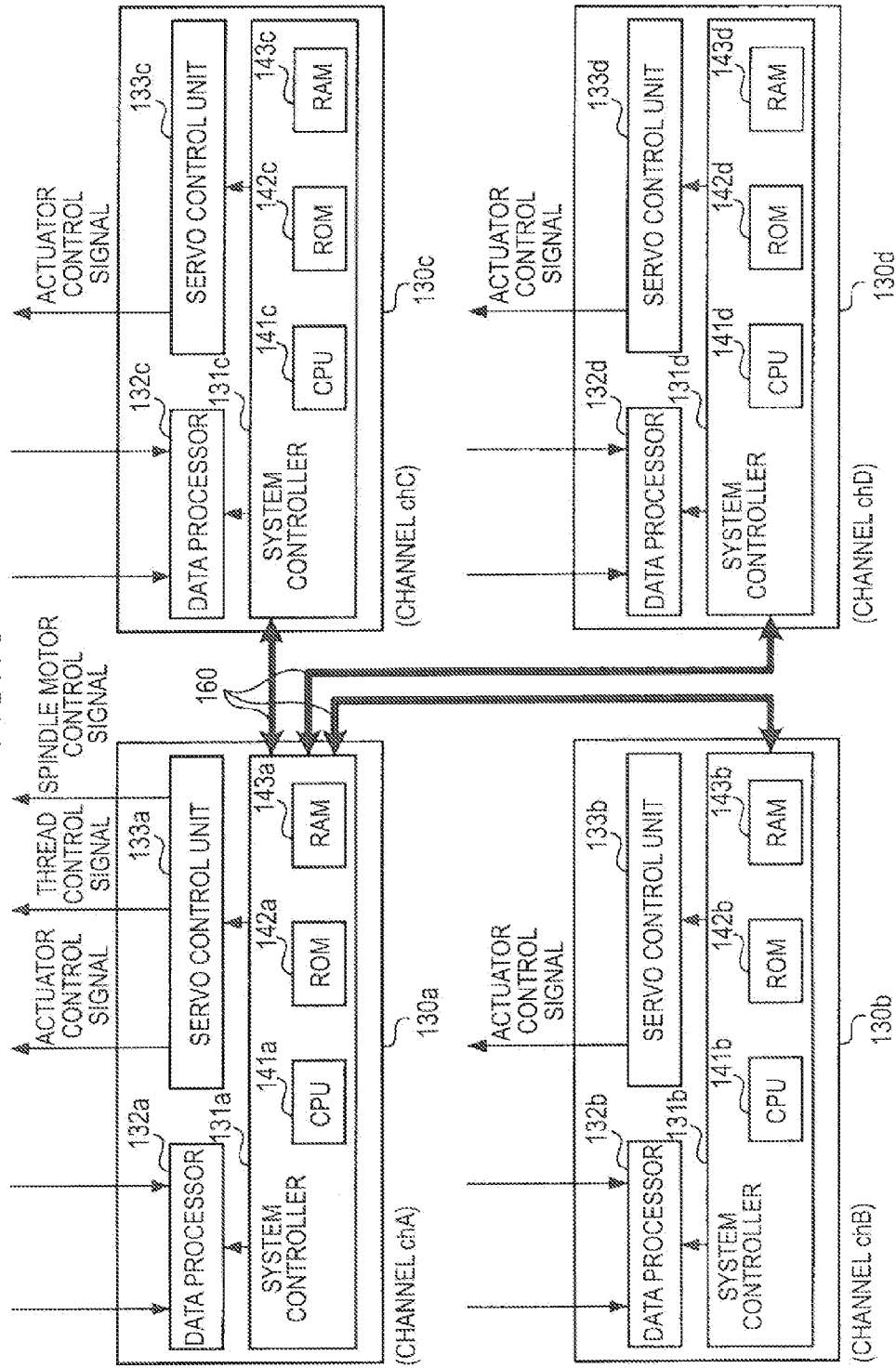
FIG. 10 is a block diagram illustrating an exemplary configuration of the optical disc recording apparatus according to the first modification of the present disclosure.

FIG. 10 illustrates exemplary configurations of the control units 130a to 130d of the channels chA to chD, respectively. In FIG. 10, like reference numerals denote like elements as in FIG. 2, and detailed description will not be repeated. As shown in FIG. 10, the system controllers 131a to 131d of the channels chA to chD, respectively, are connected to each other through the inter-channel communication unit 160. The servo control unit 133a of the control unit 130a of the channel chA controls the spindle motor 101 (not shown) and the thread 103 (FIG. 9) which is only a single thread in the optical disc recording apparatus 10a. The servo control units 133b to 133d in each control unit control the position on the thread 103 of the object lens 121a to 121d (FIG. 9) in the optical head units 110b to 110d of each channel.

Figure 11:
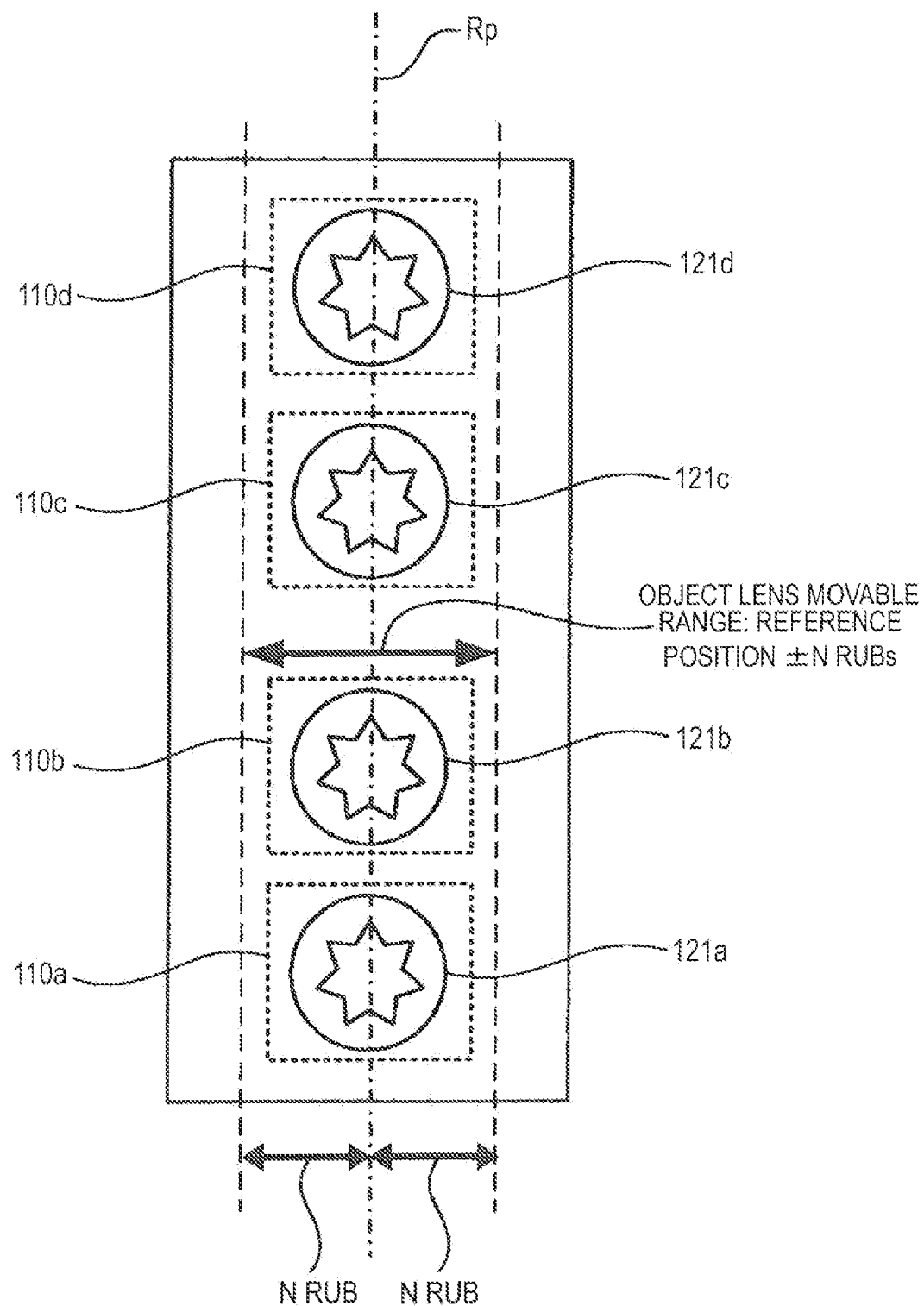
FIG. 11 is a top view illustrating an exemplary movable range of an object lens according to the first modification of the present disclosure.

FIG. 11 is a diagram illustrating movable ranges of the object lens 121a to 121d on the thread 103. Similar to those described in conjunction with FIG. 21 as the related art or in the embodiments described above, each of the object lenses 121a to 121d is configured to independently move on the thread 103. That is, the object lenses 121a to 121d are independently movable by ±N RUBs with respect to the reference position Rp indicated by the one-dotted dashed line on the thread 103 in the radial direction of the optical disc 150. That is, the object lenses 121a to 121d can separately move with a maximum interval of 2N RUBs from each other.

Figure 12:
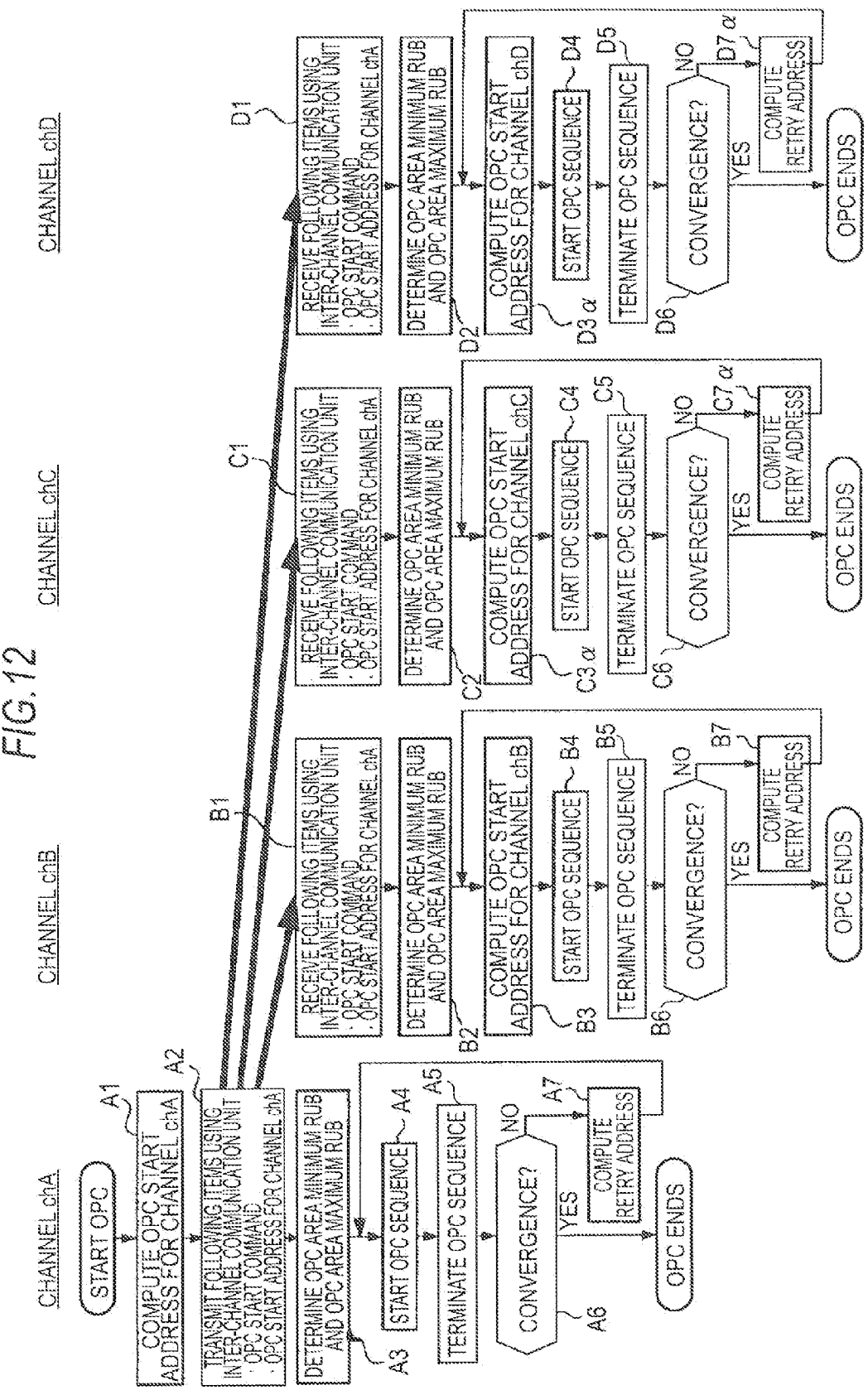
FIG. 12 is a flowchart illustrating an exemplary method of determining an OPC start address according to the first modification of the present disclosure.

Next, a method of determining the OPC start address according to the present embodiment, in which the number of optical head units is 4, will be described with reference to the flowchart of FIG. 12. In FIG. 12, like reference numerals denote like elements as in FIG. 3. Steps A1 to A7 for the channel chA of FIG. 12 and steps B1 to B7 of the channel chB are the same as those illustrated in FIG. 3, and description thereof will not be repeated. The sequences for the channels chC and chD of FIG. 12 are also similar to those for the channel chB of FIGS. 3 and 12. Such sequences are different from those described above in steps C3α and C7α for the channel chC and steps D3α and D7α for the channel chD.

In steps C3α and D3α, the OPC start addresses for each channel are computed. The OPC start address can be computed using the following Equation 9, in which "6" added to the OPC start address SAd_A for the channel chA is changed to "6x (6×x)" in the Equation 1 described above.

$$OPC \text{ start address } SAd\_X \text{ for channel } chx = OPC \text{ start address } SAd\_A \text{ for channel } chA + 6x(RUB) \quad \text{(Equation 9)}$$

In addition, in the Equation 9 described above, the reference symbol "B" or "C" indicating the channel name is denoted by "X." "X" may be substituted with a symbol corresponding to the channel name of the channels chB to chD except for the channel chA serving as a reference for computing the OPC start address.

In the Equation 9 described above, a value 1 to 3 is inserted into the variable x multiplied by "6" which is added to the OPC start address SAd_A as shown in FIG. 13A. That is, the value (n−1) is inserted, where the channel chA is used as the first channel, and the channel chX is used as the (n)th channel. For example, if the channel chC is set to the third channel, a value x=(3−1)=2 is inserted. If the channel chD is set to the fourth channel, a value x=(4−1)=3 is inserted.

Therefore, for example, the OPC start address SAd_C for the channel chC (x=2 in FIG. 13A) can be computed using the following equation.

$$OPC \text{ start address } SAd\_A \text{ for channel } chA + 6 \times 2(RUB).$$

The OPC start address SAd_D for the channel chD (x=3 in FIG. 13A) can be computed using the following equation.

$$OPC \text{ start address } SAd\_A \text{ for channel } chA + 6 \times 3(RUB)$$

However, similar to the embodiment described above, if OPC start address SAd_X for channel chX+5 (RUB)>OPC area maximum RUB maxR, it is necessary to compute the OPC start address SAd_X for the channel chX again using the following Equation 10.

$$OPC \text{ start address } SAd\_X \text{ for channel } chX = OPC \text{ start address } SAd\_A \text{ for channel } chA - 6x(RUB) \quad \text{(Equation 10)}$$

In this manner, it is possible to obtain the OPC start address for the channel chX (B to D according to the present embodiment) on a 6-RUBs basis with respect to the OPC start address for the channel chA by computing the OPC start address SAd_X for each channel.

In addition, although the number of optical head units is exemplarily set to 4 in the present embodiment, the present embodiment may be similarly applied to a case where the number of optical head units is equal to or greater than 4. In this case, similar to the present embodiment, it is possible to compute the OPC start address by selecting the value x corresponding to the number of channels and substituting it for the Equation 9 as shown in FIG. 13B.

Returning to FIG. 12, the flowchart will be described. In steps C7α and D7α of FIG. 12, the OPC retry start address RAd_X for the channel chX is computed. The OPC retry start address RAd_X for the channel chX can be computed based on the value of the retry start address RAd_A for the channel chA, similar to the embodiment described above. The retry start address RAd_A for the channel chA can be computed using the following sequences (sequence-1) to (sequence-3). However, the equations used in each sequence are different between a case where the number of optical head units is two (according to the first embodiment) and a case where the number of optical head units is four (or three or more) (according to the first modification).

First, (sequence-1) will be described. In (sequence-1), the group numbers of (6M)RUBs in the OPA area is computed for the upper and lower sides of the OPC start address SAd_A for the channel chA in this order. Here, "M" denotes the number of optical head units (=the number of channels ch). That is, since the number of optical head units is exemplarily set to 4 according to the present embodiment, "4" is substituted for M. In the lower side of the OPC start address SAd_A for the channel chA, the address able to be set as the retry start address RAd_A can be computed using the following Equation 11.

address that can be set as retry start address $RAd\_A = OPC$ start address $SAd\_A - (6M)j$ (Equation 11)

Figure 14:
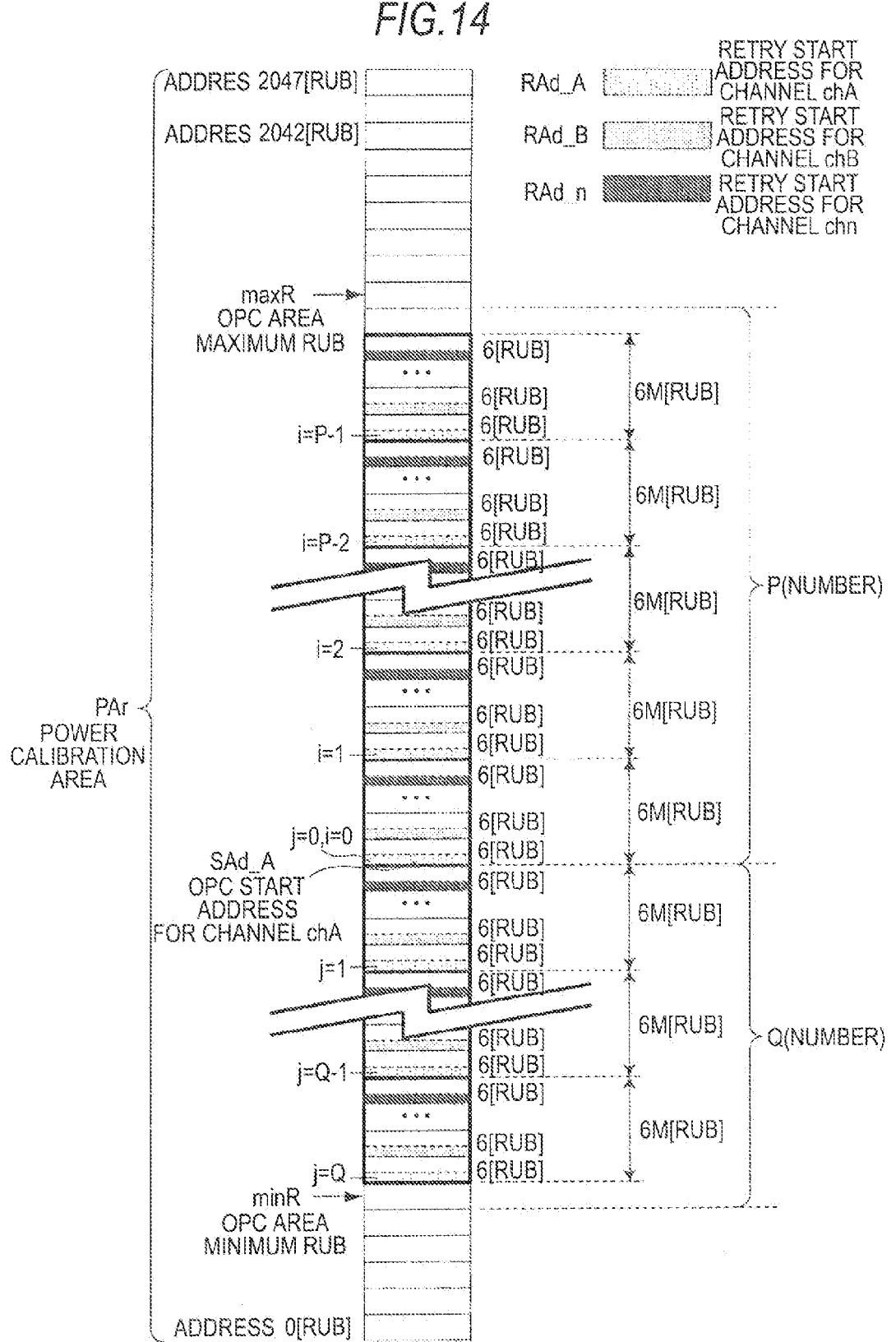
FIG. 14 is an explanatory diagram illustrating an exemplary method of determining a retry start address according to the first modification of the present disclosure.

In Equation 11 described above, the variable j is defined as described above, and a natural number equal to or greater than zero is substituted. As shown in FIG. 14, if variable j=0, the computation result of the Equation 11 becomes equal to the OPC start address SAd_A. In addition, the maximum value of the variable j becomes equal to the maximum number of groups of (6M)RUBs in the lower side of the OPC start address SAd_A, that is, the group number Q. The group number Q can be obtained using the following Equation 12.

group number $Q$ of $(6M)RUBs = (OPC$ start address $SAd\_A - OPC$ area minimum $RUB$ min$R)/(6M)$ (Equation 12)

Then, the group number P of (6M)RUBs in the upper side of the OPC start address SAd_A is computed. Before computing the group number P, first, the address that can be set as the retry start address RAd_A in the upper side of the OPC start address SAd_A will be considered. The address that can be set as the retry start address RAd_A in the upper side of the OPC start address SAd_A can be computed using the following Equation 13.

address that can be set as retry start address $RAd\_A = OPC$ start address $SAd\_A + (6M)i$ (Equation 13)

The variable i is defined as described above, and is substituted with a natural number equal to or greater than zero. As shown in FIG. 14, if variable i=0, the computation result of the Equation 13 becomes equal to the OPC start address SAd_A. The maximum value of the variable i is equal to the group number P−1. The group number P can be obtained using the following Equation 14.

group number $P$ of $(6M)RUBs = (OPC$ area maximum $RUB$ max$R - OPC$ start address $SAd\_A)/(6M)$ (Equation 14)

Subsequently, as described in conjunction with the (sequence-2), a random number is generated from the range determined by the group numbers P and Q. Specifically, the random number k is generated from the range $-Q \leq k \leq P-1$. In addition, the retry start address RAd_A is determined using the following Equation 15 (sequence-3).

retry start address $RAd\_A = OPC$ start address $SAd\_A + (6M)k$ (Equation 15)

The retry start addresses RAd_X for other channels chX can be obtained using the following Equation 16.

chX retry start address $SAd\_X = OPC$ start address $RAd\_A$ for channel $chA + (6M)k + 6x$ (Equation 16)

That is, the location deviated by (6x)RUBs with respect to the retry start address RAd_A for the channel chA computed using the "OPC start address SAd_A for channel chA+(6M)k" is set to the retry start address RAd_X for the channel chX. In addition, since the random number k is independently generated by the system controller of the channel chX, the value of the random number k may be different between a part of or all of the channels ch.

The variable x in the Equation 16 described above is equal to the variable x shown in FIGS. 13A and 13B. That is, the variable x varies depending on the value "X" of the channel chX. For example, in the case of the channel chB (x=1), the following equation is obtained by substituting "x=1" for the Equation 16.

chB retry start address $RAd\_B = OPC$ start address $SAd\_A$ for channel $chA + (6M)k + (6 \times 1)$ In the case of the channel chC (x=2) as shown in FIGS. 13A and 13B, the following equation is obtained by substituting "x=2" for the Equation 16.

chC retry start address $RAd\_C = OPC$ start address $SAd\_A$ for channel $chA + (6M)k + (6 \times 2)$ In this manner, according to the first modification of the present disclosure, the channel chA retry start address is determined from the address at an interval of (6M)RUBs with respect to the OPC start address SAd_A for channel chA. In addition, the retry start address for the channel chX is determined from the address at an interval of (6M+6x)RUBs. In addition, such a retry start address is selected from the movable range of the object lenses 121a to 121d, that is, between the minimum RUB minR and the maximum RUB maxR of the OPC area. As a result, even when the OPC retry is simultaneously performed for each channel, the OPC operation does not interfere between the channels. In addition, since the retry start address can be independently determined for each channel, it is not necessary to use inter-channel communication, and it is possible to reduce the overhead.

3. Second Modification

Two Optical Head Units are Loaded on Each of Two Threads

Next, description will be made for an exemplary case where a plurality of optical head units are used as in the first embodiment, but they are distributedly arranged on a plurality of threads in the same number. In the following description, it is assumed that two threads are used, and two optical head units are arranged on each of the threads, but the present disclosure is not limited thereto. For example, a different number of optical head units may be loaded on the thread.

Figure 15A:
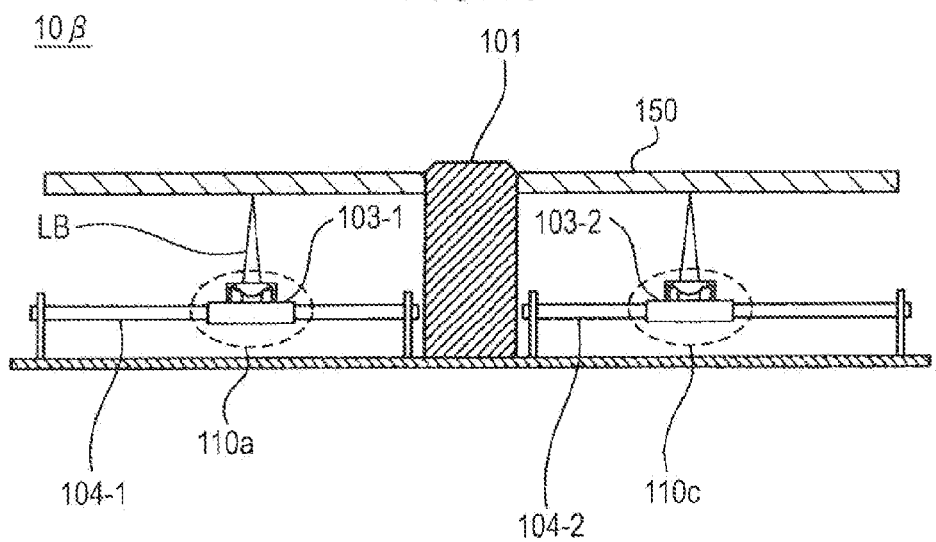
FIGS. 15A and 15B are a side view and a top view, respectively, illustrating an exemplary configuration of an optical disc recording apparatus according to a second modification of the present disclosure.
Figure 15B:
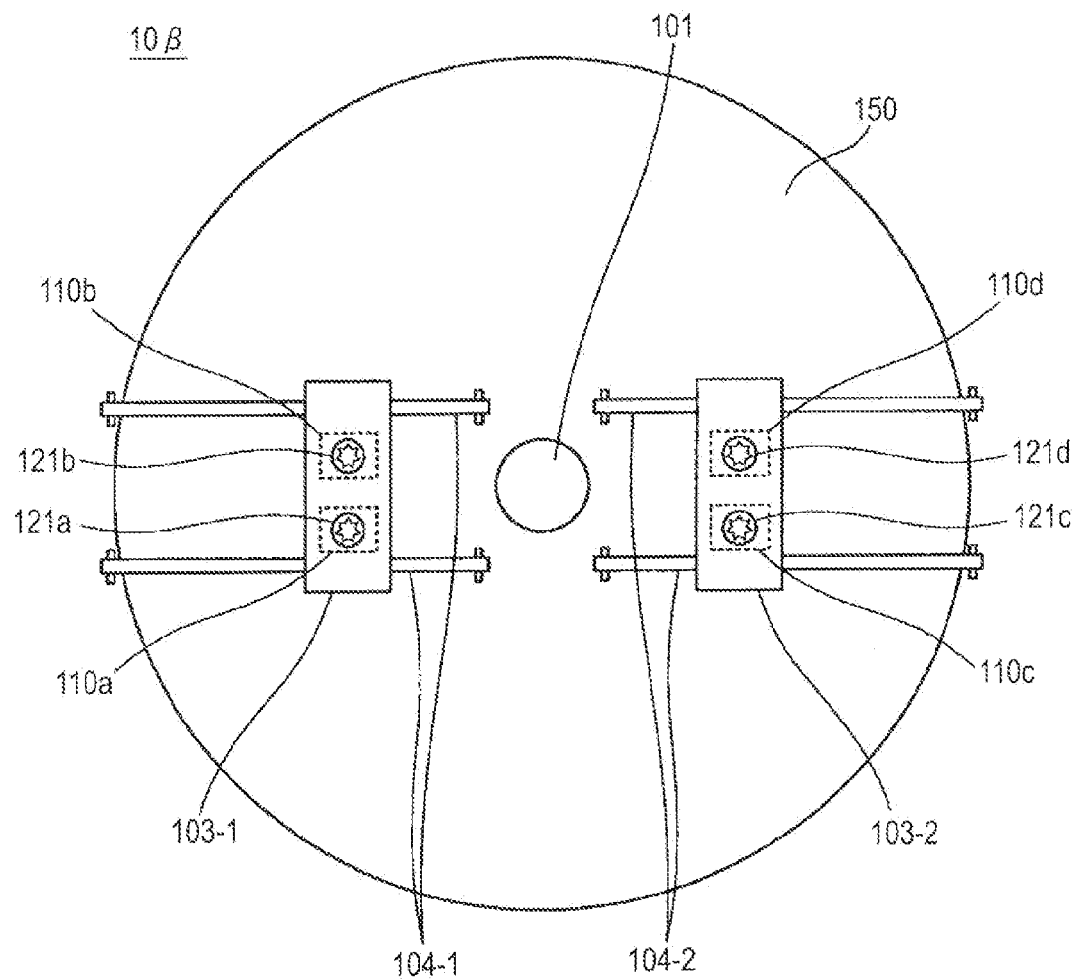

FIGS. 15A and 15B illustrate an exemplary case where two threads are used, and two optical head units are arranged on each of the threads. FIGS. 15A and 15B are a side view and a top view, respectively, illustrating an optical disc recording apparatus 10β. In FIGS. 15A and 15B, like reference numerals denote like elements as in FIGS. 1A and 1B and FIG. 9, and description thereof will not be repeated. Unlike the configuration of FIG. 9, two threads 103-1 and 103-2 are used. As shown in FIG. 15B, the optical head units 110a and 110b are arranged on the thread 103-1, and the optical head units 110c and 110d are arranged on the thread 103-2. The thread 103-1 moves in parallel with the planar surface of the optical disc 150 along the axis 104-1, and the thread 103-2 moves in parallel with the planar surface of the optical disc 150 along the axis 104-2. Since FIG. 15A is a side view, only the optical head units 110a and 110c are illustrated. However, the optical head unit 110b is arranged behind the optical head unit 110a, and the optical head unit 110d is arranged behind the optical head unit 110c.

FIG. 16 is a block diagram illustrating the optical head units 110a to 110d and the control units 130a to 130d for controlling the optical head units 110a to 110d in detail. In FIG. 16, like reference numerals denote like elements as in FIGS. 2 and 10, and description thereof will not be repeated. The position control of the thread 103-1 along the axis 104-1 (supply of the thread control signal) is performed by the servo control unit 133a of the control unit 130a for the channel chA. In addition, the position control of the thread 103-2 along the axis 104-2 is performed by the servo control unit 133c of the control unit 130c for the channel chC. The inter-channel communication unit 160 is provided between the system controllers 131a and 131b arranged on the same thread 103-1 and between the system controllers 131c and 131d arranged on the same thread 103-2. In order to connect different threads, the inter-channel communication unit 160 is also provided between the system controller 131a on the thread 103-1 and the system controller 131c on the thread 103-2.

Figure 17:
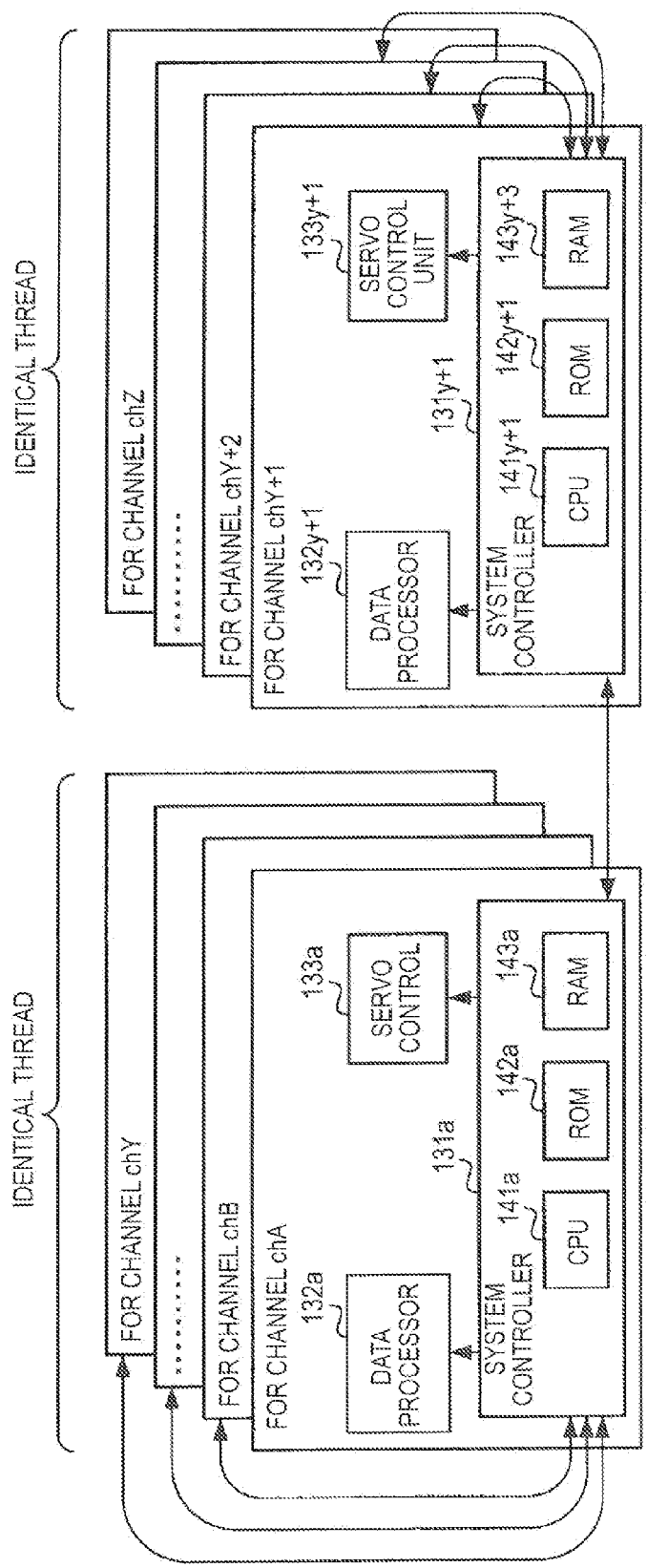
FIG. 17 is an explanatory diagram illustrating an exemplary configuration of an inter-channel communication unit according to the second modification of the present disclosure.

Although the number M of the optical head units is set to 4 according to the present embodiment, a similar configuration may be achieved even when the number M may be set to a different number. FIG. 17 illustrates an inter-channel communication path when the number of channels chA to chZ is set to M. Out of the channels chA to chZ, the optical head units for handling the channels chA to chY are loaded on one thread, and the optical head units for handling the channels chY+1 to chZ are loaded on the other thread (Y=½ Z). Each system controller corresponding to each optical head unit is connected to the system controller of the channel serving as a master. The channels chA and chY+1 serve as the master channels in the example of FIG. 17. The channels chA and chY+1 serving as a master are also connected to each other using the inter-channel communication unit 160. The system controllers of the channels chA and chY+1 serving as a master also control the operation of the thread itself. In addition, the movable range of each object lens loaded on the same thread is similar to that of FIG. 1 or 11.

Figure 18:
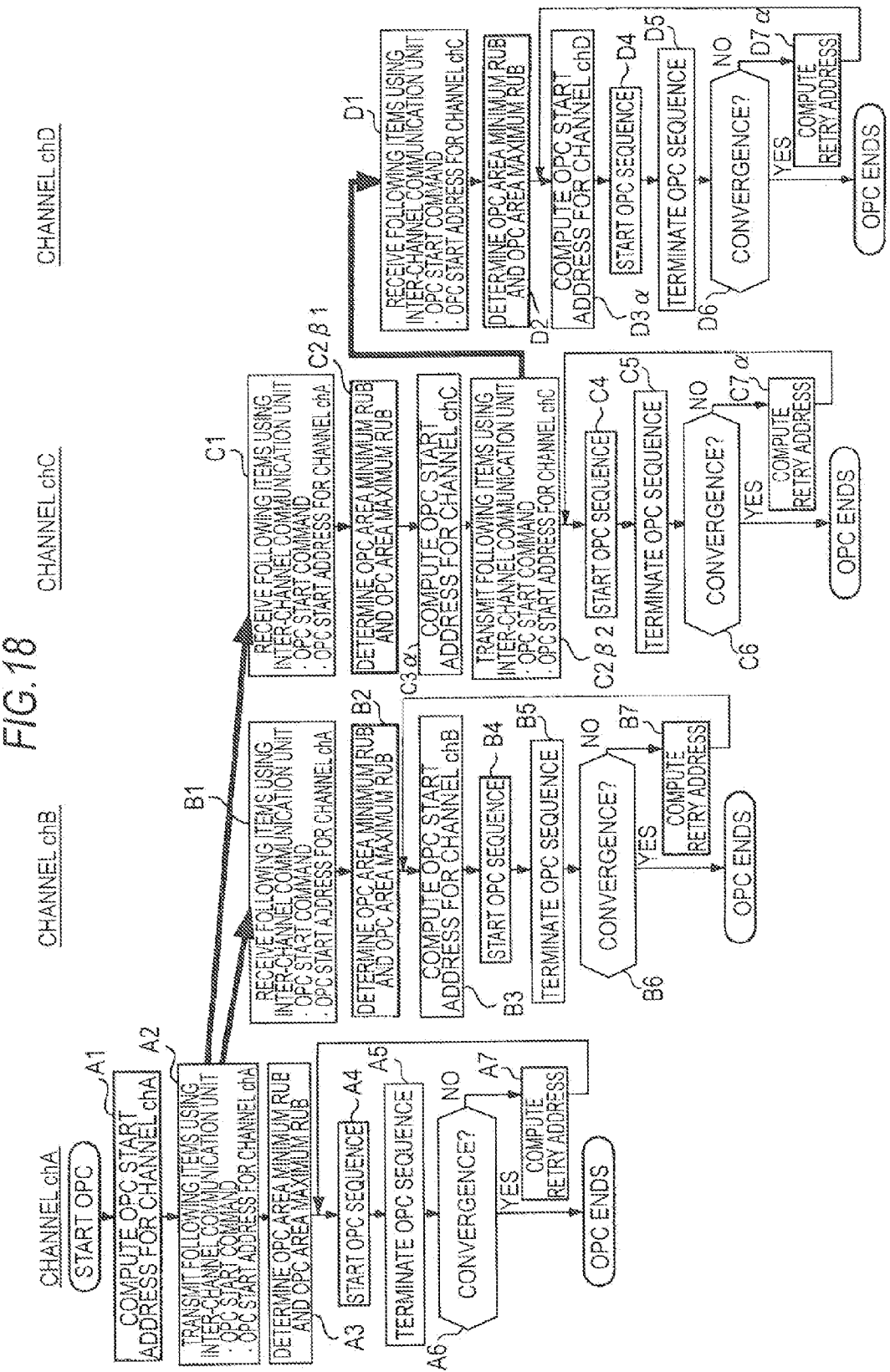
FIG. 18 is a flowchart illustrating an exemplary method of determining an OPC start address according to the second modification of the present disclosure.

Next, a method of determining the OPC start address for each channel when a plurality of threads are used according to the present embodiment will be described with reference to the flowchart of FIG. 18. In FIG. 18, like reference numerals denote like elements as in FIG. 12. FIG. 18 is different from FIG. 12 in steps C2β1 and C2β2 in the master channel chC. In step C2β1, the system controller 131c (FIG. 16) of the channel chC determines the OPC area minimum RUB minR and the maximum RUB maxR. According to the present embodiment, the OPC area minimum RUB minR and the OPC area maximum RUB maxR are independently determined for the thread 103-2 (FIG. 16) controlled by the system controller 131c itself of the channel chC. That is, the OPC area for the channel chC defined by the OPC area minimum RUB minR and the OPC area maximum RUB maxR is determined. Hereinafter, the OPC area for the channel chC will be referred to as a channel chC side OPC area ArC (second recording power calibration area).

Meanwhile, the system controller 131a of the channel chA also determines the OPC area minimum RUB minR and the OPC area maximum RUB maxR in step A3 of FIG. 18. The OPC area for the channel chA defined by these values will be referred to as a channel chA side OPC area ArA. The system controller 131c of the channel chC can recognize the minimum RUB minR and the maximum RUB maxR of the OPC area ArA in the channel chA based on the OPC start address SAd_A for the channel chA obtained in step C1.

Based on such information, the system controller 131c of the channel chC can determine the channel chC side OPC area ArC to not overlap the channel chA side OPC area ArA. If the channel chC side OPC area ArC is determined in this manner, the channel chC side may allocate the OPC start address and the retry start address only to the optical head units 110c and 110d (refer to FIGS. 15A and 15B) loaded on the same thread.

Figure 19:
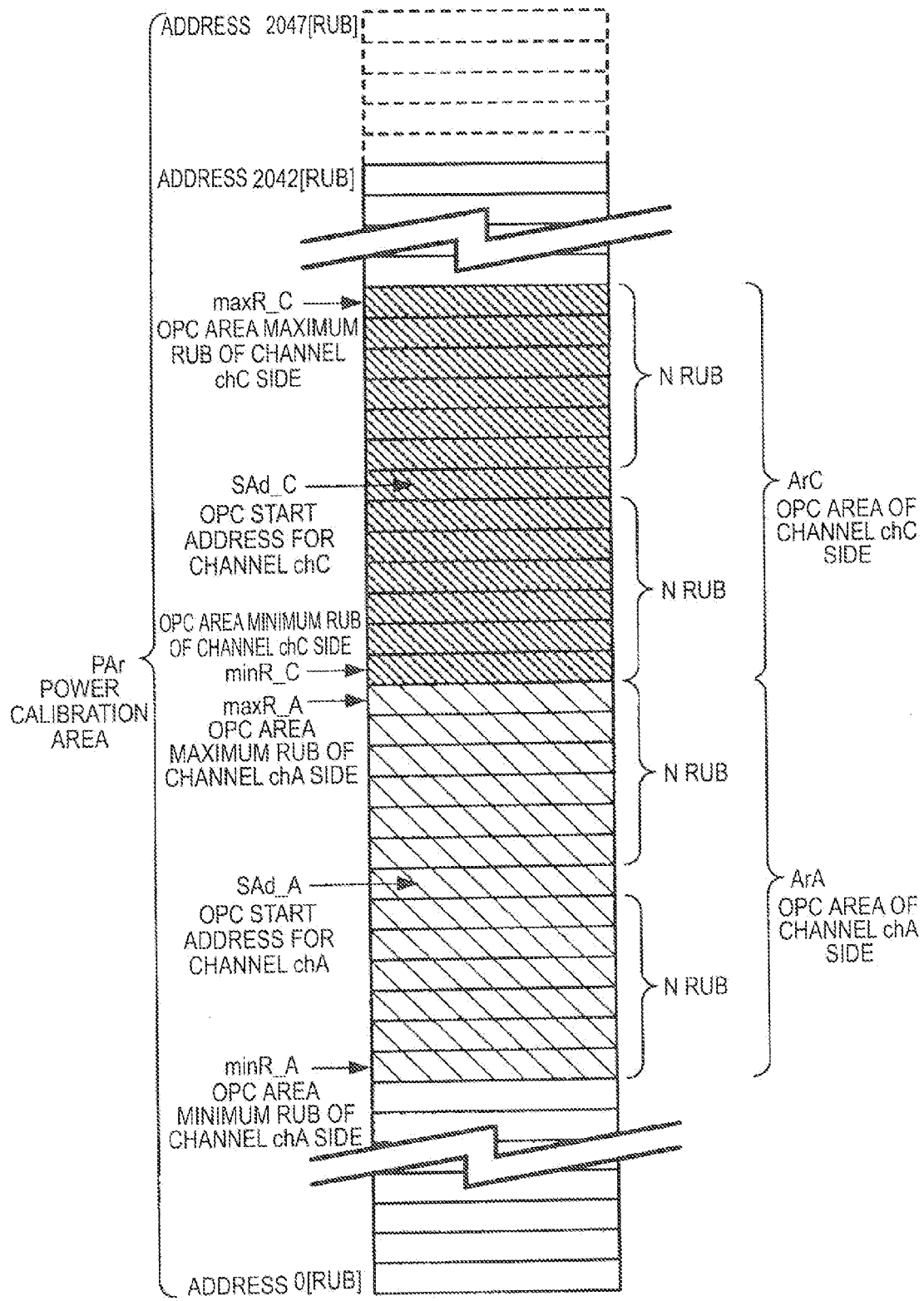
FIG. 19 is an explanatory diagram illustrating an exemplary method of determining an OPC area according to the second modification of the present disclosure.
Figure 20A:
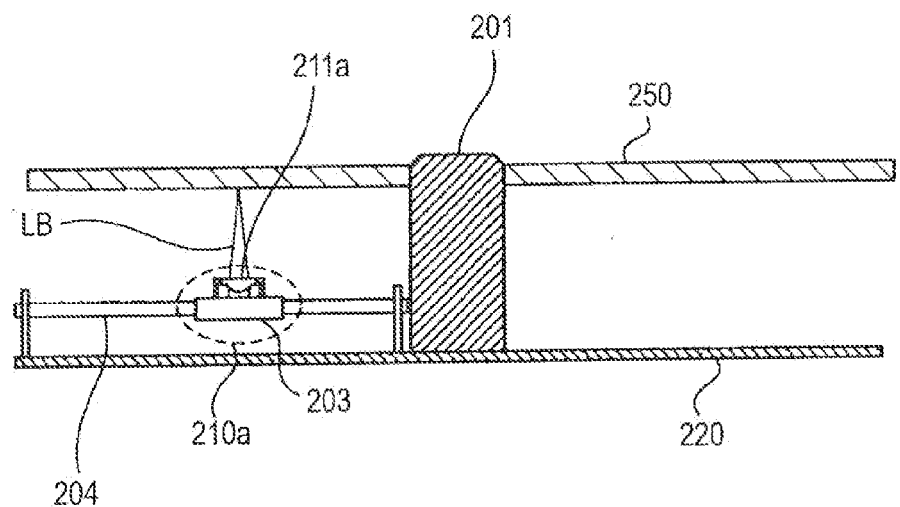
FIGS. 20A and 20B are a side view and a top view, respectively, illustrating an exemplary configuration of an optical disc recording apparatus of a related art.
Figure 20B:
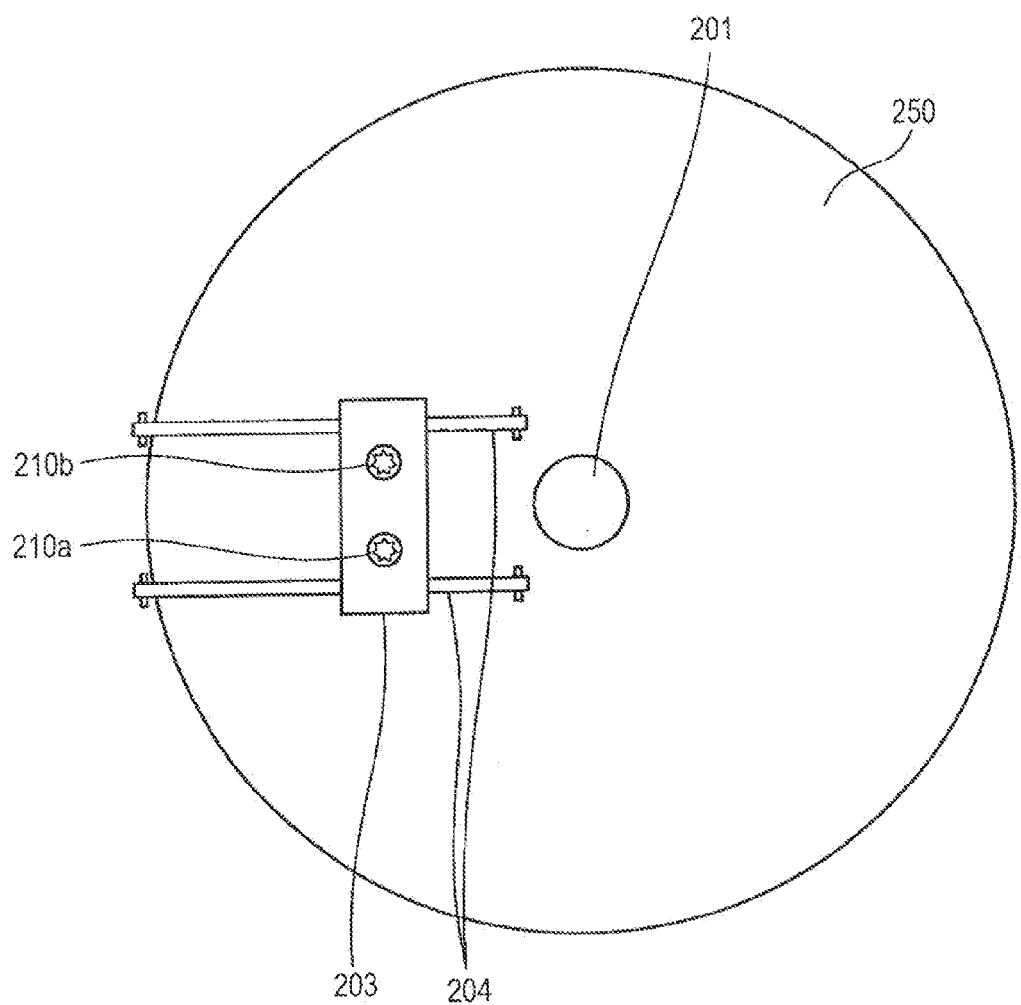

FIG. 19 illustrates an example of determining the channel chC side OPC area ArC. In FIG. 19, the channel chA side OPC area ArA is densely hatched using oblique solid lines, and the channel chC side OPC area ArC is coarsely hatched using oblique solid lines. As described above, the system controller 131c of the channel chC can recognize the OPC area minimum RUB minR_A and the OPC area maximum RUB maxR_A in the channel chA side. The system controller 131c of the channel chC sets the RUB next to the OPC area maximum RUB maxR_A in the channel chA side as the channel chC side OPC area minimum RUB minR_C based on this information. In addition, the RUB distant from the OPC area minimum RUB minR_C by N RUBs in a backward direction is set to the OPC start address SAd_C for the channel chC. Furthermore, the RUB distant from the OPC start address SAd_C for the channel chC by N RUBs in a backward direction is set to channel chC side OPC area maximum RUB maxR_C. As a result, it is possible to determine the channel chC side OPC area ArC to not overlap the channel chA side OPC area ArA.

In the channel chC side OPC area ArC determined in this manner, the upper limit (OPC area maximum RUB maxR_C) thereof may upwardly exceed the upper limit (address 2042 (RUB)) of the power calibration area PAr. In this case, the channel chC side OPC area ArC may be provided under the channel chA side OPC area ArA. In a case where the channel chC side OPC area ArC provided under the channel chA side OPC area ArA downwardly exceeds the lower limit (address 0(RUB)) of the power calibration area PAr, this means that the size of the channel chA side OPC area ArA and the size of the channel chC side OPC area ArC are too large relative to the size of the power calibration area PAr. In this case, the channel chX OPC start address SAd_X and the channel chX retry start address RAd_X may be determined using the technique similar to that of the first modification. Which technique out of those described in the first and second modifications is used as a method of determining the OPC start address SAd_X may be determined based on the size of the power calibration area PAr and the movable range of the object lens on the thread employed in the optical disc recording apparatus.

As the channel chC side OPC area ArC is determined, the OPC start addresses SAd for other channels controlled on the same thread may be determined from such a range. The OPC start addresses SAd in each channel can be computed by substituting the "channel chA" with "channel chC" in Equation 9 described above. That is, the OPC start addresses can be computed as follows.

$$\text{OPC start address } SAd\_X \text{ for channel } chX = OPC \text{ start address } SAd\_C \text{ for channel } chC + 6 \times (RUB)$$

If channel chX OPC start address SAd_X+5 (RUB)>OPC area maximum RUB maxR_C, the OPC start address SAd_X for the channel chX upwardly exceeds the upper limit of the channel chC side OPC area ArC. In this case, similar to the embodiments described above, it is necessary to compute the OPC start address SAd_X for the channel chX. The OPC start address SAd_X for the channel chX can be computed using the following equation in which the "channel chA" is substituted with the "channel chC" in Equation 10 described above.

$$\text{OPC start address } SAd\_X \text{ for channel } chX = OPC \text{ start address } SAd\_C - 6 \times (RUB) \text{ for channel } chC$$

The retry start addresses RAd_X for each channel chX in the channel chC side OPC area ArC can be computed by substituting "channel chA" with "channel chC" in the Equations 12, 14, and 15 described above. Specifically, first, using the Equation 12 where substitution has been made, the group number Q of 6M(RUB) in the lower side of the OPC start address for the channel chC is obtained. Then, using the Equation 14 where substitution has been made, the group number P of 6M (RUB) in the upper side of the OPC start address for the channel chC is obtained. Then, using the obtained group numbers P and Q, the random number k is generated from the range $-Q \leq k \leq P-1$. Finally, using the Equation 15 where the substitution has been made, the retry start address RAd_X in the channel chX is computed.

In this manner, according to the present embodiment described as the second modification, it is possible to obtain the effects similar to those obtained in each embodiment described above. Furthermore, according to the present embodiment, the channel chC side OPC area ArC is determined to not overlap the channel chA side OPC area ArA. As a result, in the channel chC side thread, it is possible to determine the OPC start address SAd_X and the retry start address RAd_Z of each channel without considering the channel chA side OPC area ArA. Therefore, in comparison with the OPC in which a single thread is used, a wider range is used as the power calibration area PAr. The fact that a wider range can be used as the power calibration area PAr means frequency of overwriting the same address can be reduced. As the frequency of rewriting the same address increases, degradation of the recording film is expedited, and a probability that the written signal is abnormally read increases. Therefore, considering that the OPC is repeated using the same optical disc 150, the fact that the overwriting frequency is reduced is a remarkable advantage.

Similarly, according to the present embodiment described as the second modification, the retry start address RAd_X and the OPC start address for each channel chX may be determined using the technique similar to that described in the first modification.

The present disclosure contains subject matter related to that disclosed in Japanese Priority Patent Application JP 2010-285542 filed in the Japan Patent Office on Dec. 22, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc recording method of determining a disc address when write and read operations are performed for an optical disc during recording power calibration in an optical disc recording apparatus having at least two optical head units including first and second optical head units, the method comprising:
    determining a first recording power calibration start address, which is an address at which the first optical head unit starts calibration of the recording power, from a power calibration area provided in advance as an area used to calibrate the recording power; and
    determining an address obtained by adding a range of the power calibration area used to calibrate the recording power to the first recording power calibration start address as a second recording power calibration start address, which is an address at which the second optical head unit starts calibration of the recording power.

2. The method according to claim 1, wherein
    an object lens in the first optical head unit and an object lens in the second optical head unit are independently movable within a range ±N RUBs with respect to a reference position, and
    the range ±N RUBs with respect to the first recording power calibration start address is set as a recording power calibration area, which is an area that can be used to calibrate the recording power.

3. The method according to claim 2, wherein, in a case where an address obtained by adding a value obtained by subtracting 1 from the range of the power calibration area to the second recording power calibration start address is higher than an address of an upper limit of the recording power calibration area, an address obtained by subtracting the range of the power calibration area from the first recording power calibration start address is selected as the second recording power calibration start address.

4. The method according to claim 3, wherein, in a case where there is no recording power calibration convergence, and the recording power calibration is restarted, a retry start address, which is an address for restarting the recording power calibration, of the first optical head unit is determined from an address group obtained by adding or subtracting a first range obtained by multiplexing the range of the power calibration area by the number of optical head units to/from the first recording power calibration start address, and a retry start address of the second optical head unit is determined from an address group obtained by adding or subtracting a second range obtained by adding the power calibration area to the first range to/from the first recording power calibration start address.

5. An optical disc recording apparatus comprising:
    a rotation drive unit that rotates an optical disc;
    a first optical head unit having an object lens for irradiating laser light onto the optical disc or transmitting return light from the optical disc;
    a second optical head unit arranged in parallel with the first optical head unit;
    a thread on which the first and second optical head units are loaded to move in parallel with the optical disc in a radial direction of the optical disc;
    a first servo control unit that controls the rotation drive unit and controls a position of the object lens of the first optical head unit on the thread;
    a second servo control unit that controls a position of the object lens of the second optical head unit on the thread;
    a first system controller that determines a first recording power calibration start address, which is an address at which the first optical head unit starts calibration of the recording power, out of a power calibration area provided in advance as an area for calibrating recording power of the laser light, and supplies the first recording power calibration start address to the first servo control unit; and
    a second system controller that determines an address obtained by adding a range of a power calibration area used to calibrate the recording power to the first recording power calibration start address as a second recording power calibration start address, at which the second optical head unit starts calibration of the recording power, and supplies the second recording power calibration start address to the second servo control unit.

6. The optical disc recording apparatus according to claim 5, wherein
    an object lens in the first optical head unit and an object lens in the second optical head unit are independently movable within a range ±N RUBs with respect to a reference position, and
    the first system controller sets the range ±N RUBs with respect to the first recording power calibration start address as the recording power calibration area, which is an area that can be used to calibrate the recording power.

7. The optical disc recording apparatus according to claim 6, wherein, in a case where an address obtained by adding a value obtained by subtracting 1 from a range of the power calibration area to the second recording power calibration start address is higher than an address of an upper limit of the recording power calibration area, the second system controller selects an address obtained by subtracting a range of the power calibration area from the first recording power calibration start address as the second recording power calibration start address.

8. The optical disc recording apparatus according to claim 7, wherein, in a case where there is no recording power calibration convergence, and the recording power calibration is restarted, the first system controller determines a retry start address, which is an address for restarting the recording power calibration, from an address group obtained by adding or subtracting a first range obtained by multiplexing the range of the power calibration area by the number of optical head units to/from the first recording power calibration start address, and the second system controller determines a retry start address from an address group obtained by adding or subtracting a second range obtained by adding the power calibration area to the first range to/from the first recording power calibration start address.

9. The optical disc recording apparatus according to claim 8, wherein the first and second system controllers are connected using communication means, and
the second system controller computes the second recording power calibration start address based on the first recording power calibration start address transmitted from the first system controller through the communication means.

10. The optical disc recording apparatus according to claim 9, wherein the thread includes a first thread on which the first optical head unit is loaded and a second thread on which the second optical head unit is loaded', and
the second system controller computes a/second recording power calibration area having a different range from that of the recording power calibration area based on the first recording power calibration start address transmitted from the first system controller through the communication means.

* * * * *